US007565937B2

(12) United States Patent
Deguchi et al.

(10) Patent No.: US 7,565,937 B2
(45) Date of Patent: Jul. 28, 2009

(54) ELECTRIC VEHICLE

(75) Inventors: Yoshitaka Deguchi, Yokohama (JP);
Ichiro Yamaguchi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 520 days.

(21) Appl. No.: 11/217,336

(22) Filed: Sep. 2, 2005

(65) Prior Publication Data

US 2006/0048976 A1 Mar. 9, 2006

(30) Foreign Application Priority Data

Sep. 6, 2004 (JP) ............................. 2004-258788

(51) Int. Cl.
*B60K 1/02* (2006.01)
*B60K 17/30* (2006.01)
(52) U.S. Cl. ...................... 180/6.28; 180/6.5; 180/253; 180/65.1; 701/22
(58) Field of Classification Search ............... 180/6.24, 180/6.26, 6.32, 6.5, 65.1, 253, 6.2, 65.5, 180/907, 6.28, 445, 446; 701/22, 41, 72, 701/74
See application file for complete search history.

(56) References Cited

U.S. PATENT DOCUMENTS 5,547,038 A * 8/1996 Madwed ................... 180/253

| 6,648,426 | B1 * | 11/2003 | Boettiger et al. ............ 303/146 |
| 6,862,512 | B2 * | 3/2005 | Arndt et al. .................... 701/70 |
| 6,865,461 | B2 * | 3/2005 | Neef et al. ..................... 701/41 |
| 2003/0107265 | A1 * | 6/2003 | Arnold ....................... 303/139 |
| 2005/0071084 | A1 * | 3/2005 | Knoop et al. ................ 701/301 |
| 2005/0236217 | A1 * | 10/2005 | Koelin et al. ................ 180/411 |
| 2006/0113119 | A1 * | 6/2006 | Dudeck et al. ............... 180/6.2 |

FOREIGN PATENT DOCUMENTS

| JP | 4-103467 A | 4/1992 |
| JP | 06-098418 A | 4/1994 |
| JP | 2005-178527 A | 7/2005 |
| JP | 2005-184971 A | 7/2005 |

OTHER PUBLICATIONS

Masato Abe, "Jidosha No Undo To Seigyo", [Vehicle Dynamics and Control], 1992, Sankaido; ISBN 4-381-10052-2, pp. 52, 194 and 203-207.

* cited by examiner

*Primary Examiner*—Anne Marie M. Boehler
(74) *Attorney, Agent, or Firm*—Foley & Lardner LLP

(57) ABSTRACT

An electric vehicle includes a vehicle body, a front wheel supported on the vehicle body for steering motion in accordance with motion of the vehicle body, a pair of rear wheels supported on the vehicle body for steering motion, a steering unit configured to regulate a steer angle of each of the rear wheels, a motor unit configured to independently apply a wheel torque to each of the rear wheels, and a control unit. The control unit is configured to control the total of the wheel torques in accordance with an associated setpoint, and to control the steer angles and the difference between the wheel torques so that the attitude and the yaw rate vary in accordance with associated setpoints.

19 Claims, 17 Drawing Sheets

DIRECTION OF VEHICLE PATH

DIRECTION OF VEHICLE PATH

ELECTRIC VEHICLE

BACKGROUND OF THE INVENTION

The present invention relates generally to electric vehicles, and more particularly to an electric vehicle including a pair of rear steerable drive wheels.

A Published Japanese Patent Application No. H4(1992)-103467 (hereinafter referred to as "JP4-103467") shows a four-wheeled electric vehicle which includes a drive motor for independently driving each of its road wheels on an associated one of its axles, and a steering motor for independently steering each of its road wheels on an associated one of its kingpins. The range of the steer angle of each of the road wheels is larger than or equal to 180°.

SUMMARY OF THE INVENTION

The electric vehicle shown in JP4-103467 needs to include four drive motors, and four steering devices such as the steering motors, in order to perform its intended operations. This results in increasing the cost of the electric vehicle. In addition, this electric vehicle needs to allocate to each of the four road wheels space large enough to accommodate the steering device and the road wheel swinging over a range of 180° or larger. This adversely affects the interior space of the electric vehicle and the degree of freedom of vehicle design.

Accordingly, it is an object of the present invention to provide an electric vehicle which is configured to perform intended operations such as small turn, diagonal movement, and turn-in-place movement, and constructed providing wide space utility with a small cost.

According to one aspect of the present invention, an electric vehicle comprises: a vehicle body; a front wheel supported on the vehicle body for steering motion in accordance with motion of the vehicle body; a pair of rear wheels supported on the vehicle body for steering motion; a steering unit configured to regulate a steer angle of each of the rear wheels; a motor unit configured to independently apply a wheel torque to each of the rear wheels; a first setpoint determination section configured to determine a setpoint of a total of the wheel torques; a second setpoint determination section configured to determine a setpoint of an attitude of the vehicle body; a third setpoint determination section configured to determine a setpoint of a yaw rate of the vehicle body; and a control unit connected for signal communication to the steering unit, the motor unit, the first setpoint determination section, the second setpoint determination section, and the third setpoint determination section, the control unit being configured to perform the following: controlling the total of the wheel torques in accordance with the associated setpoint; and controlling the steer angles and the difference between the wheel torques so that the attitude and the yaw rate vary in accordance with the associated setpoints.

According to another aspect of the invention, a vehicle comprises: a vehicle body; a non-drive wheel supported on the vehicle body; a pair of drive wheels supported on the vehicle body for steering motion; a steering unit configured to regulate a steer angle of each of the drive wheels; and a motor unit configured to independently apply a wheel torque to each of the drive wheels.

According to a further aspect of the invention, an electric vehicle comprises: a vehicle body; a front wheel supported on the vehicle body, and adapted to be free from a force along a lateral direction of the vehicle body; a pair of rear wheels supported on the vehicle body for steering motion; first setpoint determination means for determining a setpoint of a total of a wheel torque to each of the rear wheels; second setpoint determination means for determining a setpoint of an attitude of the vehicle body; third setpoint determination means for determining a setpoint of a yaw rate of the vehicle body; steering control means for controlling a steer angle of each of the rear wheels so that the attitude and the yaw rate vary in accordance with the associated setpoints; motor control means for controlling the total of the wheel torques in accordance with the associated setpoint, and for controlling the difference between the wheel torques at least in accordance with the setpoint of the yaw rate.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
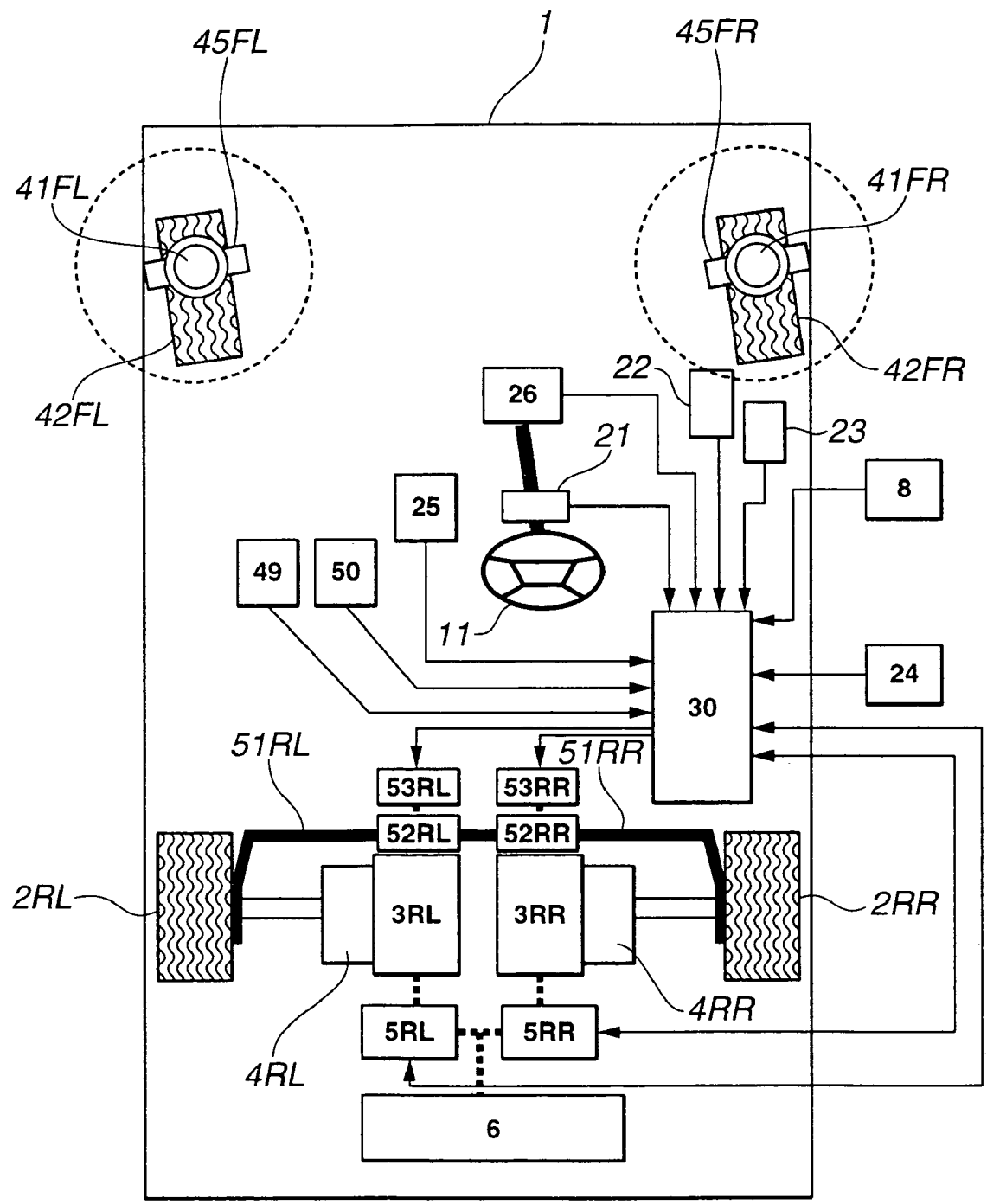
FIG. 1 is a schematic diagram depicting an electric vehicle in accordance with an embodiment of the present invention.

Referring now to FIGS. 1 through 19, there is shown an electric vehicle in accordance with an embodiment of the present invention. FIG. 1 is a schematic diagram depicting the electric vehicle. As shown in FIG. 1, left and right reversible electric motors 3RL, 3RR are mounted on a body 1 of the electric vehicle, serving as a driving source. The shafts of left and right electric motors 3RL, 3RR are drivingly connected to rear road wheels 2RL, 2RR via speed reducers 4RL, 4RR, respectively. The electric vehicle is basically bilaterally symmetrical. That is, the characteristics of left electric motor 3RL, the gear ratio of left speed reducer 4RL, and the radius of left rear road wheel 2RL are identical to those of right electric motor 3RR, right speed reducer 4RR, and right rear road wheel 2RR, respectively.

Electric motors 3RL, 3RR are each a three phase synchronous motor having a rotor including a permanent magnet. Left and right driving circuits 5RL, 5RR are configured to control the torques of electric motors 3RL, 3RR in acceleration and regeneration in accordance with left and right rear motor torque commands tTRL, tTRR from an electrical control unit 30, by adjusting electric charge/supply between a lithium-ion battery 6 and electric motors 3RL, 3RR, respectively. In situations in which rear road wheels 2RL, 2RR slip if the motor torques are controlled in accordance with left and right rear motor torque commands tTRL, tTRR, the motor torque for each of rear road wheels 2RL, 2RR are adjusted or limited. Driving circuits 5RL, 5RR each includes an angular position sensor to measure the speed of an associated one of electric motors 3RL, 3RR, and sends a state signal indicative of the motor speed to control unit 30. The adjustment or limitation of the motor torques for avoiding slip of rear road wheels 2RL, 2RR may be implemented by a method as disclosed in a Published Japanese Patent Application No. H6(1994)-98418. This method is configured to estimate a reaction force from a road to a road wheel, and to control a motor torque in accordance with the estimated reaction force. Alternatively, the limitation may be implemented by a method as disclosed in a reference of Sakai et al, "Lateral Motion Stabilization with Feedback Controlled Wheels," 6th International Symposium on Advanced Vehicle Control, 2002. This method uses a model of a relationship between a wheel speed and a motor torque. The motor torque for each of road wheels is independently controlled in accordance with the difference between the wheel speed of the model and an actual wheel speed. Furthermore, the limitation may be implemented by a method of controlling the motor torque so that the slippage of the wheel is held within predetermined bounds.

Figure 2A:
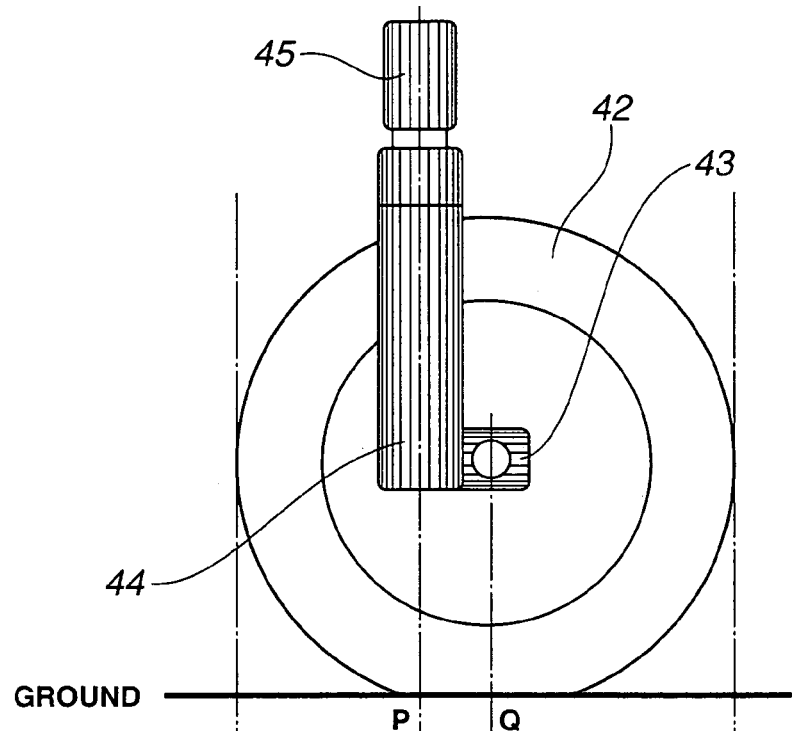
FIG. 2A is a side view of a front wheel of the electric vehicle of FIG. 1.
Figure 2B:
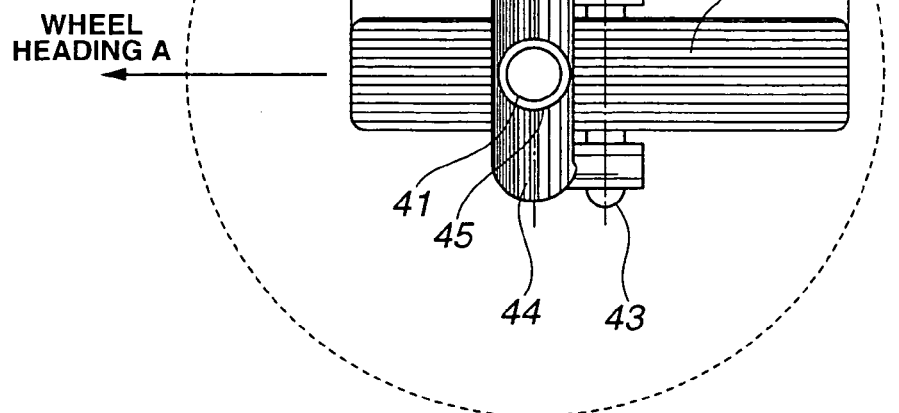
FIG. 2B is a top view of the front wheel of FIG. 2A.

Left and right front road wheels 42FL, 42FR are supported on front wheel pivots 41FL, 41FR for swinging motion or steering motion. FIGS. 2A and 2B show one of front road wheels 42FL, 42FR, which is a caster wheel indicated by 42. Front wheel pivot 41 is mounted in a hallow support member 45 and rotatably supported on support member 45 via a bearing. Members 43, 44 and front road wheel 42 are coupled to front wheel pivot 41 and supported on support member 45 for rotating on front wheel pivot 41 as a unit. In FIG. 2A, the intersection point between the longitudinal axis of front wheel pivot 41 and the ground is indicated by a point P. The central point of a contact area with the ground is indicated by a point Q. The distance between the points P and Q is set to a positive value $\xi$, so that front road wheel 42 is naturally steered in a manner that the wheel heading A follows the direction of horizontal motion of front wheel pivot 41. Thus, the front wheel unit is constructed as a caster wheel. Support member 45 is supported by vehicle body 1 via a longitudinal member and a lateral member, preventing support member 45 from deformation in the longitudinal and lateral direction. Support member 45 is built in with a spring and damper in the vertical direction, absorbing the vertical force from the ground to vehicle body 1 via front wheel 42. The front wheel unit includes a hydraulic frictional brake mounted on member 44 to brake front wheel 42. The hydraulic pressure varies in accordance with the depression of a brake pedal. The brake pedal being depressed, the brake fluid pressure increases to actuate a brake pad fixed to member 44. The brake pad binds a brake disc rotating integrally of front wheel 42, to brake front wheel 42. Thus, front wheel 42 is supported on vehicle body 1 for steering motion in accordance with motion of vehicle body 1.

Rear road wheels 2RL, 2RR are each provided with a frictional brake which is controlled in accordance with the depression of brake pedal 22 as in front wheel 42. Left rear road wheel 2RL is connected to a linkage 51RL. A steering motor 52RL is provided to actuate linkage 51RL in the lateral direction and thereby to steer left rear road wheel 2RL. Steering motor 52RL is connected to and driven by a driving circuit 53RL. Driving circuit 53RL is configured to regulate the torque of steering motor 52RL in accordance with the measured steer angle sent from a steer angle sensor attached to left rear road wheel 2RL and a target left rear steer angle tδrl sent from control unit 30, so that the actual steer angle varies in accordance with target left rear steer angle tδrl. Right rear road wheel 2RR is connected to a linkage 51RR. A steering motor 52RR is provided to actuate linkage 51RR in the lateral direction and thereby to steer right rear road wheel 2RR. Steering motor 52RR is connected to and driven by a driving circuit 53RR. Driving circuit 53RR is configured to regulate the torque of steering motor 52RR in accordance with the measured steer angle sent from a steer angle sensor attached to right rear road wheel 2RR and a target right rear steer angle tδrr sent from control unit 30, so that the actual steer angle varies in accordance with target right rear steer angle tδrr.

As shown in FIG. 1, left and right electric motors 3RL, 3RR, and battery 6 are disposed near the axles of rear road wheels 2RL, 2RR, so that the center of mass of the electric vehicle is nearer to the rear axle than to the front axle. Weight balance of the electric vehicle is designed so that the ratio of a load imposed on front road wheels 42FL, 42FR, and a load imposed on rear road wheels 2RL, 2RR is a value such as 2:8.

Shift lever 25 is operable to take five positions, that is, P, D, R, A, AR, and B. The position P is selectable during the electric vehicle being at rest, and used for parking. The position D is used for normal driving. The position R is used for normal rearward driving. The position A is used for driving in A mode as described below. The position AR is used for rearward driving in A mode. The position B is used for driving in B mode as described below. The A mode serves for turning on a point near an inside one of the rear wheels. The B mode serves for turning on a central point of the rear axle. The shift position is selected by manual operation of a driver.

Control unit 30 includes a microcomputer, and peripheral devices such as RAM and ROM. Control unit 30 is configured to receive sensor signals and other state signals from the following sensors and devices. An accelerator pedal sensor 23 is provided to measure an accelerator opening and to output a signal indicative of the accelerator opening to control unit 30. Accelerator pedal sensor 23 serves as a first setpoint determination section for determining a setpoint of a total of the wheel torques. A brake pedal sensor 22 is provided to measure a depressing force to the brake pedal and to output a signal indicative of the depressing force to control unit 30. A steering wheel displacement sensor 26 is disposed at a pivot of steering wheel 11 which allows lateral displacement of steering wheel 11, in order to measure the lateral displacement of steering wheel 11 and to output a signal indicative of the lateral displacement to control unit 30. Steering wheel displacement sensor 26 serves as a second setpoint determination section for determining a setpoint of an attitude of vehicle body 1. A steering wheel angle sensor 21 is provided to measure the angular position of steering wheel 11 and to output a signal indicative of the angular position to control unit 30. Steering wheel angle sensor 21 serves as a third setpoint determination section for determining a setpoint of a yaw rate of vehicle body 1. An acceleration sensor 24 is provided to measure a longitudinal acceleration of vehicle body 1 and to output a signal indicative of the longitudinal acceleration to control unit 30. A yaw rate sensor 8 is provided to measure a yaw rate of vehicle body 1 and to output a signal indicative of the yaw rate to control unit 30. Shift lever 25 is configured to output a signal indicative of its state, i.e. the shift position to control unit 30. Front wheel speed sensors 49, 50 are disposed at front wheel axles 43FR, 43RR, to measure the rotational speeds of front road wheels 42FL, 42FR, and to output signals indicative of the rotational speeds. Control unit 30 is configured to process the received signals, to determine or compute left rear motor torque command tTRL for left electric motor 3RL and right rear motor torque command tTRR for right electric motor 3RR, and to output signals indicative of the torques to driving circuits 5RL, 5RR. Left rear motor torque command tTRL and right rear motor torque command tTRR are defined to be positive in a direction to accelerate the electric vehicle forward, and expressed in the unit [Nm]. Control unit 30 is also configured to determine or compute target left rear steer angle tδrl and target right rear steer angle tδrr, and to output signals indicative of the angles to driving circuits 53RL, 53RR. The rear steer angles are defined to be positive in the left direction and expressed in the unit [rad].

Figure 3:
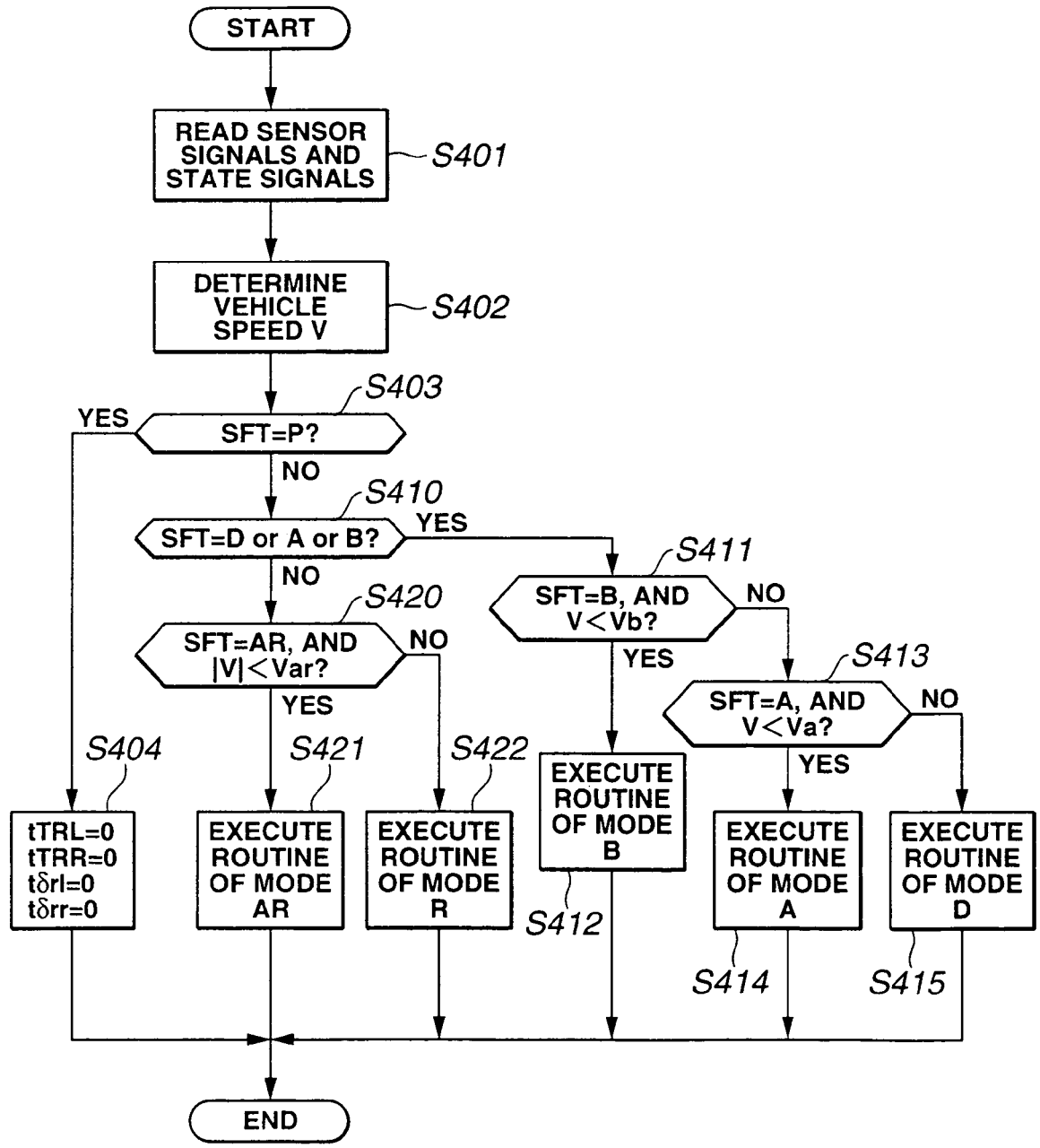
FIG. 3 is a flow chart depicting a routine of mode selection to be executed by a control unit of the electric vehicle of FIG. 1.

The following describes operations of the electric vehicle. FIG. 3 is a flow chart depicting a routine of mode selection to be executed by control unit 30. The routine is executed at intervals of a predetermined processing time interval such as 5 ms, called by timer interrupt. Although steps of communications within control unit 30 is not shown in FIG. 3, processed data is stored in the memories, updating the previous data, and reference information is read from the memories, as occasion arises. As shown in FIG. 3, first, at step S401, control unit 30 reads the sensor signals from the sensors and the state signal from driving circuits 5RL, 5RR, and stores the read values in RAM variables. Specifically, the accelerator opening is stored in a variable APS, the brake depressing force is stored in a variable BRK, the lateral displacement of steering wheel 11 is stored in a variable Win, the angular position of steering wheel 11 is stored in a variable δ, the vehicle lateral acceleration is stored in YG, the vehicle yaw rate is stored in a variable Y, and the shift lever position is stored in a variable SFT. The front wheel speeds from front wheel speed sensors 49, 50 are stored in variables NFL, NFR. The rotational speeds of the motors from driving circuits 5RL, 5RR are stored in variables NRL, NRR. The speeds NFL, NFR, NRL, and NRR are defined to be positive in a direction of the electric vehicle traveling forward, and expressed in the unit [rad/s].

Subsequent to step S401, at step S402, control unit 30 determines vehicle speed V, which is defined to be positive in a direction of the vehicle traveling forward, using the following equation.

$$V=(NFL \cdot Rf + NFR \cdot Rf + NRL/GG \cdot Rr + NRR/GG \cdot Rr)/4$$

where Rf is the radius of the front wheel, Rr is the radius of rear wheel, and GG is the gear ratio of speed reducers 4RL, 4RR.

Subsequent to step S402, at step S403, control unit 30 determines whether or not the shift lever position SFT is "P." When the answer to step S403 is affirmative (YES), the routine proceeds to step S404. On the other hand, when the answer to step S403 is negative (NO), the routine proceeds to step S410.

At step S404, control unit 30 sets each of tTRL, tTRR, tδrl, and tδrr to zero. Subsequent to step S404, the routine returns.

At step S410, control unit 30 determines whether or not the shift lever position SFT is one of "D," "A," and "B." When the answer to step S410 is YES, the routine proceeds to step S411. On the other hand, when the answer to step S410 is NO, the routine proceeds to step S420.

At step S411, control unit 30 determines whether or not the shift lever position SFT is "B" and vehicle speed V is smaller than a predetermined second threshold speed Vb such as a speed of 3 [m/s]. When the answer to step S411 is YES, the routine proceeds to step S412. At step S412, control unit 30 executes a routine of B mode as described below. Subsequent to step S412, the routine returns. On the other hand, when the answer to step S411 is NO, the routine proceeds to step S413.

At step S413, control unit 30 determines whether or not the shift lever position SFT is "A" and vehicle speed V is smaller than a predetermined first threshold speed Va such as a speed of 3 [m/s]. When the answer to step S413 is YES, the routine proceeds to step S414. At step S414, is control unit 30 executes a routine of A mode as described below. Subsequent to step S414, the routine returns. On the other hand, when the answer to step S413 is NO, the routine proceeds to step S415. At step S415, control unit 30 executes a routine of D mode described below. Subsequent to step S415, the routine returns.

At step S420, control unit 30 determines whether or not the shift lever position SFT is "AR" and the absolute value of vehicle speed V is smaller than a predetermined threshold speed Var such as a speed of 2 [m/s]. When the answer to step S420 is YES, the routine proceeds to step S421. At step S421, control unit 30 executes a routine of AR mode as described below. Subsequent to step S421, the routine returns. On the other hand, when the answer to step S420 is NO, the routine proceeds to step S422. At step S422, control unit 30 executes a routine of R mode as described below. Subsequent to step S422, the routine returns.

The following describes behaviors of mode selection in accordance with the mode selection logic as mentioned above. When the shift lever position is "P" which is selectable during the electric vehicle being at lest and used for parking, a sequence of steps S401, S402, S403, and S404 is executed in the flow chart of FIG. 3. Finally, at step S404, left rear motor torque command tTRL for left electric motor 3RL, right rear motor torque command tTRR for right electric motor 3RR, target left rear steer angle tδrl, and target right rear steer angle tδrr are all set to zero. Subsequently, the routine returns.

When the shift lever position is "D," "A," or "B," and the conditions for A mode and B mode are not satisfied, a sequence of steps S401, S402, S403, S410, S411, S413, and S415 is executed in the flow chart of FIG. 3. Finally, at step S415, the routine of D mode is executed. Subsequently, the routine returns.

When the shift lever position is "A," and the condition for A mode in which vehicle speed V is smaller than Va is satisfied, a sequence of steps S401, S402, S403, S410, S411, S413, and S414 is executed in the flow chart of FIG. 3. Finally, at step S414, the routine of A mode is executed. Subsequently, the routine returns. Thus, even when the shift lever position is "A," A mode is inhibited and the routine of D mode is executed if vehicle speed V is larger than or equal to first threshold speed Va. This prevents instability of the dynamic behavior of the electric vehicle due to rapid transition to A mode during the electric vehicle traveling at normal speeds.

When the shift lever position is "B," and the condition for B mode in which vehicle speed V is smaller than Vb is satisfied, a sequence of steps S401, S402, S403, S410, S411, and S412 is executed in the flow chart of FIG. 3. Finally, at step S412, the routine of B mode is executed. Subsequently, the routine returns. Thus, even when the shift lever position is "B," B mode is inhibited, and the routine of D mode is executed, if vehicle speed V is larger than or equal to second threshold speed Vb. This prevents instability of the dynamic behavior of the electric vehicle due to rapid transition to B mode during the electric vehicle traveling at normal speeds.

When the shift lever position is "AR" which is used for rearward driving in A mode, and the condition for AR mode in which the absolute value of vehicle speed V is smaller than threshold value Var is satisfied, a sequence of steps S401, S402, S403, S410, S420, and S421 is executed in the flow chart of FIG. 3. Finally, at step S421, the routine of AR mode is executed. Subsequently, the routine returns. Thus, even when the shift lever position is "AR," AR mode is inhibited, and the routine of R mode is executed, if the absolute value of vehicle speed V is larger than or equal to threshold value Var. This prevents instability of the dynamic behavior of the electric vehicle due to rapid transition to AR mode during the electric vehicle traveling at normal speeds.

When the shift lever position is "R," a sequence of steps S401, S402, S403, S410, S420, and S422 is executed in the flow chart of FIG. 3. Finally, at step S422, the routine of R mode is executed. Subsequently, the routine returns.

The following describes design principles, and an embodiment of computing, of controllers in control unit 30 which are each configured to provide a normative model. First, the following describes control principals and its embodiment in D mode. Equations of motion of a vehicle having steerable front and rear wheels are described in a reference "Jidosha No Undo To Seigyo" [Vehicle Dynamics and Control] by Masato Abe, 1992 Sankaido; ISBN 4-381-10052-2 (hereinafter referred to as "Ref-1"). On page 194 of Ref-1 are shown equations of motion of a vehicle in which a front steer angle δf [rad] and a rear steer angle δr [rad] (same in left and right) are a control input, and a yaw rate of the vehicle γ [rad/s] and a sideslip angle of the center of mass of the vehicle β [rad] are a system state. This equations of motion are derived under assumption that vehicle speed V [m/s] is constant (dV=0) and not equal to zero, and that sideslip angle β is small ($|β|<<1$, $\sinβ≈β$, $\cosβ≈1$). The idea of the above-mentioned equations of motion is employed in the electric vehicle in accordance with the embodiment of the present invention. The control input includes additionally the driving force of the right rear road wheel defined as u [N] and the driving force of the left rear road wheel defined as –u [N]. The front wheels are caster wheels. Accordingly the lateral force at the front wheel is assumed to be substantially zero. Therefore, the equations of motion of the electric vehicle is described by the following equations (A1).

$$mV \cdot dβ/dt + 2K_rβ + (mV - 2L_rK_r/V)γ = 2K_rδ_r$$

$$-2L_rK_rβ + I_γ \cdot dγ/dt + (2L_r^2K_r/V)γ = -2L_rK_rδ_r + 2L_tμ \quad (A1)$$

where Lr is a distance between a rear axle and a center of mass [m], Lt is half of a rear tread [m], m is a weight of the vehicle [kg], Iγ is a yaw moment of inertia, Kr is a rear tire cornering stiffness [N/rad] which is in consideration of a decrease in a cornering power per steer angle due to deformation of the rear steering mechanism, V is a vehicle speed [m/s], γ is a yaw rate [rad/s], and β is a sideslip angle of the center of mass of the vehicle [rad]. As shown on page 52 of Ref-1, the relationship among lateral force Y [N], yaw rate γ [rad/s], and sideslip angle β [rad] are described by the following equation (A2).

$$Y = mV(dβ/dt + γ) \quad (A2)$$

The equations of motion of the electric vehicle, or the equations (A1) and (A2) are converted by Laplace transformation, and rearranged to the following equations (A3).

$$β = \{Q_{12}(s)/Q_{den}(s)\} \cdot δ_r + \{Q_{13}(s)/Q_{den}(s)\} \cdot u$$

$$γ = \{Q_{22}(s)/Q_{den}(s)\} \cdot δ_r + \{Q_{23}(s)/Q_{den}(s)\} \cdot u$$

$$Y = \{Q_{32}(s)/Q_{den}(s)\} \cdot δ_r + \{Q_{33}(s)/Q_{den}(s)\} \cdot u \quad (A3)$$

where s is the Laplace variable, and $Q_{12}(s)$, $Q_{13}(s)$, $Q_{22}(S)$, $Q_{23}(s)$, $Q_{32}(s)$, $Q_{33}(S)$, and $Q_{den}(s)$ are functions of vehicle speed V which are described by the following equations (A4).

$$Q_{12}(s) = 2VK_r(I_γs + mVL_r)$$

$$Q_{13}(s) = -2L_t(mV^2 - 2L_rK_r)$$

$$Q_{22}(s) = -2mV^2K_rL_rs$$

$$Q_{23}(s) = 2VL_t(mVs + 2K_r)$$

$$Q_{32}(s) = 2mV^2K_rI_γs^2$$

$$Q_{33}(s) = 4mVL_tK_r(L_rs + V)$$

$$Q_{den}(s) = mV^2I_γs^2 + 2VK_r(mL_r^2 + I_γ)s + 2mV^2L_rK_r \quad (A4)$$

Figure 4A:
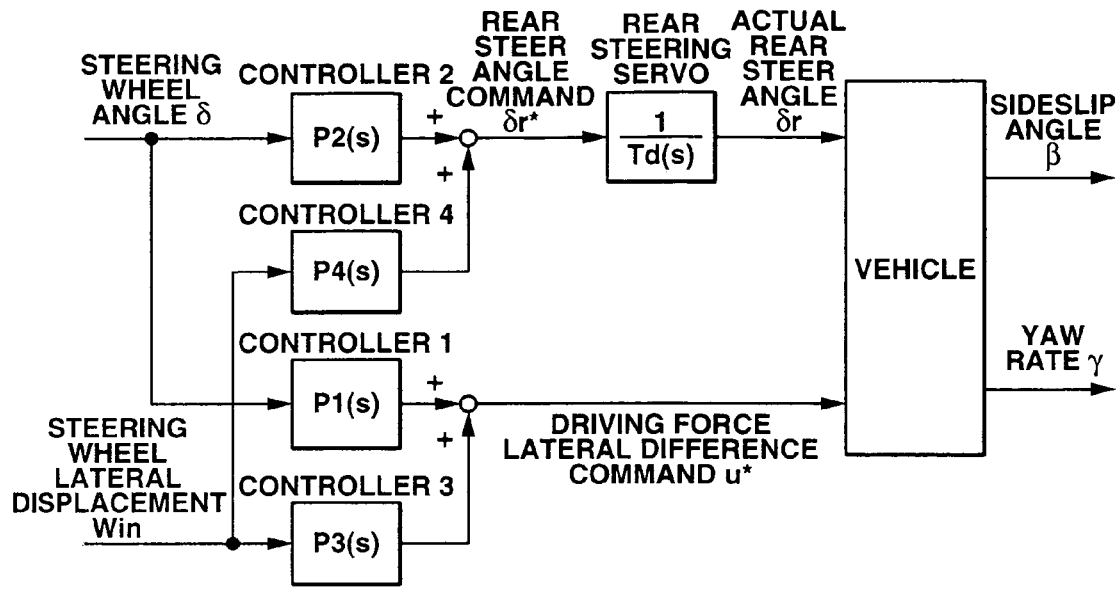
FIG. 4A is a block diagram depicting a control system of the electric vehicle of FIG. 1 in D mode.

On pages 203 to 207 of Ref-1 is shown a method of determining a controller which determines a steering wheel angle command δf* and a steering wheel angle command δr* to provide a desirable response from steering wheel angle δ to yaw rate γ and sideslip angle β. According to this method, in this embodiment, controllers for generating or computing driving force lateral difference command u* and rear steer angle command δr* are determined so that response of yaw rate γ and sideslip angle β with respect to steering wheel angle δ and response of yaw rate γ and sideslip angle β with respect to steering wheel lateral displacement Win are each a normative model or each have a desired transfer characteristic. The controllers, which are indicated by P1(s), P2(s), P3(s), and P4(s) in FIG. 4A, are derived as follows.

A desired transfer function from steering wheel angle δ to yaw rate γ is represented by $G_{γδ}$. A desired transfer function from steering wheel angle δ to sideslip angle β is represented by $G_{βδ}$. A desired transfer function from steering wheel lateral displacement Win to yaw rate γ is represented by $G_{\gamma w}$. A desired transfer function from steering wheel lateral displacement Win to sideslip angle β is represented by $G_{\beta w}$. The transfer functions are set as follows in this embodiment.

$$G_{\gamma \delta}=m_2/(s^2+2w_n s+w_n^2)$$

$$G_{\beta \delta}=0$$

$$G_{\gamma w}=0$$

$$G_{\beta w}=m_1/(s^2+2w_n s+w_n^2) \quad (A5)$$

where $w_n$ is a constant such as 4π, $m_1$ is a constant such as $w_n^2/4$, and $m_2$ is a constant such as $w_n^2$. Thus, the transfer function from steering wheel angle δ to yaw rate γ is set to a desired second-order response, and the transfer function from steering wheel lateral displacement Win to sideslip angle β is set to a desired second-order response. Sideslip angle β is independent from steering wheel angle δ, and yaw rate γ is independent from steering wheel lateral displacement Win. On the other hand, as shown in FIG. 4A, the relationship among steering wheel angle δ, steering wheel lateral displacement Win, yaw rate γ, and sideslip angle β are described by the following equations (A6).

$$\beta=[\{Q_{13}(s)/Q_{den}(s)\}P1(s)+\{Q_{12}(s)/Q_{den}(s)\}\cdot\{P2(s)/Td(s)\}]\delta+[\{Q_{13}(s)/Q_{den}(s)\}P3(s)+\{Q_{12}(s)/Q_{den}(s)\}\cdot\{P4(s)/Td(s)\}]Win$$

$$\gamma=[\{Q_{23}(s)/Q_{den}(s)\}P1(s)+\{Q_{22}(s)/Q_{den}(s)\}\cdot\{P2(s)/Td(s)\}]\delta+[\{Q_{23}(s)/Q_{den}(s)\}P3(s)+\{Q_{22}(s)/Q_{den}(s)\}\cdot\{P4(s)/Td(s)\}]Win \quad (A6)$$

Comparing the equations (A5) and (A6), the following equations (A7) is derived.

$$G_{\beta w} = m_1/(s^2 + 2w_n s + w_n^2) \quad (A7)$$
$$= \{Q_{13}(s)/Q_{den}(s)\}P3(s) + \{Q_{12}(s)/Q_{den}(s)\}\{P4(s)/Td(s)\}$$

$$G_{\beta \delta} = 0$$
$$= \{Q_{13}(s)/Q_{den}(s)\}P1(s) + \{Q_{12}(s)/Q_{den}(s)\}\{P2(s)/Td(s)\}$$

$$G_{\gamma \delta} = m_2/(s^2 + 2w_n s + w_n^2)$$
$$= \{Q_{23}(s)/Q_{den}(s)\}P1(s) + \{Q_{22}(s)/Q_{den}(s)\}\{P2(s)/Td(s)\}$$

$$G_{\gamma w} = 0$$
$$= \{Q_{23}(s)/Q_{den}(s)\}P3(s) + \{Q_{22}(s)/Q_{den}(s)\}\{P4(s)/Td(s)\}$$

where Td(s) is a delay due to the rear steering servo motor. Solving the equations (A7) and using the equations (A4), the controllers P1(s), P2(s), P3(s), and P4(s) are described by the following equations (A8) including equations (A8-1) through (A8-4). The delay due to the rear steering servo motor is set to be of first order with a time constant τ such as 0.1 [s], that is, Td(s)=τs+1.

$$P1(s)=\{m_2/(2L_t)\}\{(I_\gamma s+mVL_r)/(s^2+2w_n s+w_n^2)\} \quad (A8-1)$$

$$P2(s)=\{m_2(mV^2-2L_r K_r)/(2VK_r)\}\{(\tau s+1)/(s^2+2w_n s+w_n^2)\} \quad (A8-2)$$

$$P3(s)=\{m_1 mVL_r/(2L_t)\}\{s/(s^2+2w_n s+w_n^2)\} \quad (A8-3)$$

$$P4(s)=\{m_1(mVs+2K_r)/(2K_r)\}\{(\tau s+1)/(s^2+2w_n s+w_n^2)\} \quad (A8-4)$$

Figure 4B:
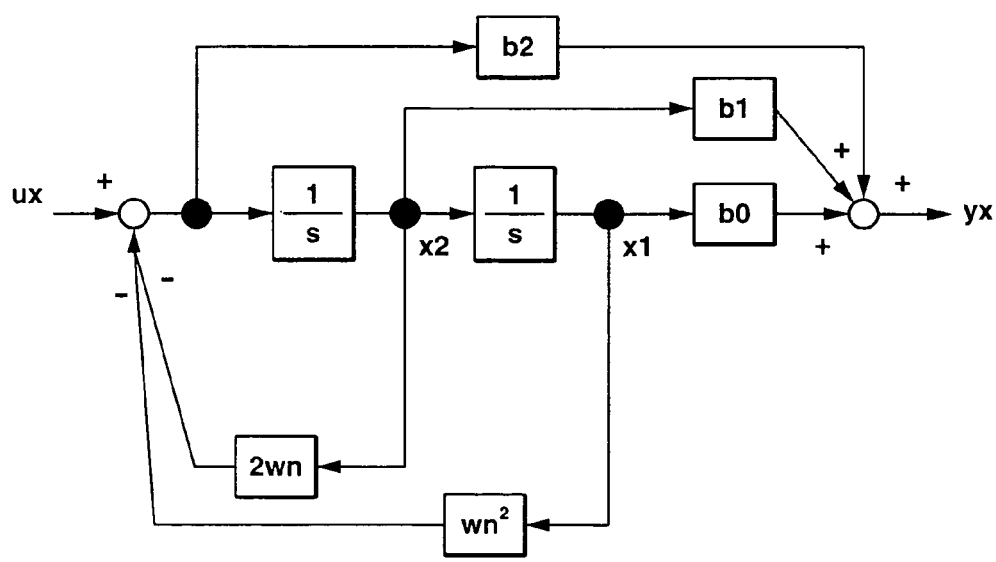
FIG. 4B is a block diagram depicting the transfer function of a controller of the control system of FIG. 4A.

The controllers P1(s), P2(s), P3(s), and P4(s) are implemented as follows. P1(s), P2(s), P3(s), and P4(s) are expressed in form of the following equation (A9).

$$yx/ux=(b2s^2+b1s+b0)/(s^2+2w_n s+w_n^2) \quad (A9)$$

where b0, b1, and b2 are functions of V. The block diagram of FIG. 4B is equivalent to the equation (A9). The output yx is computed at intervals of a predetermined time such as 5 ms. First, integration operations ($s^{-1}$) in FIG. 4B is computed by Euler integration to update X2, and X1. Next, b0, b1, and b2 are updated in accordance with vehicle speed V. Finally, the output yx is computed in accordance with X2, X1, b0, b1, and b2. Thus, yx is timely and repeatedly determined in accordance with ux.

Figure 5:
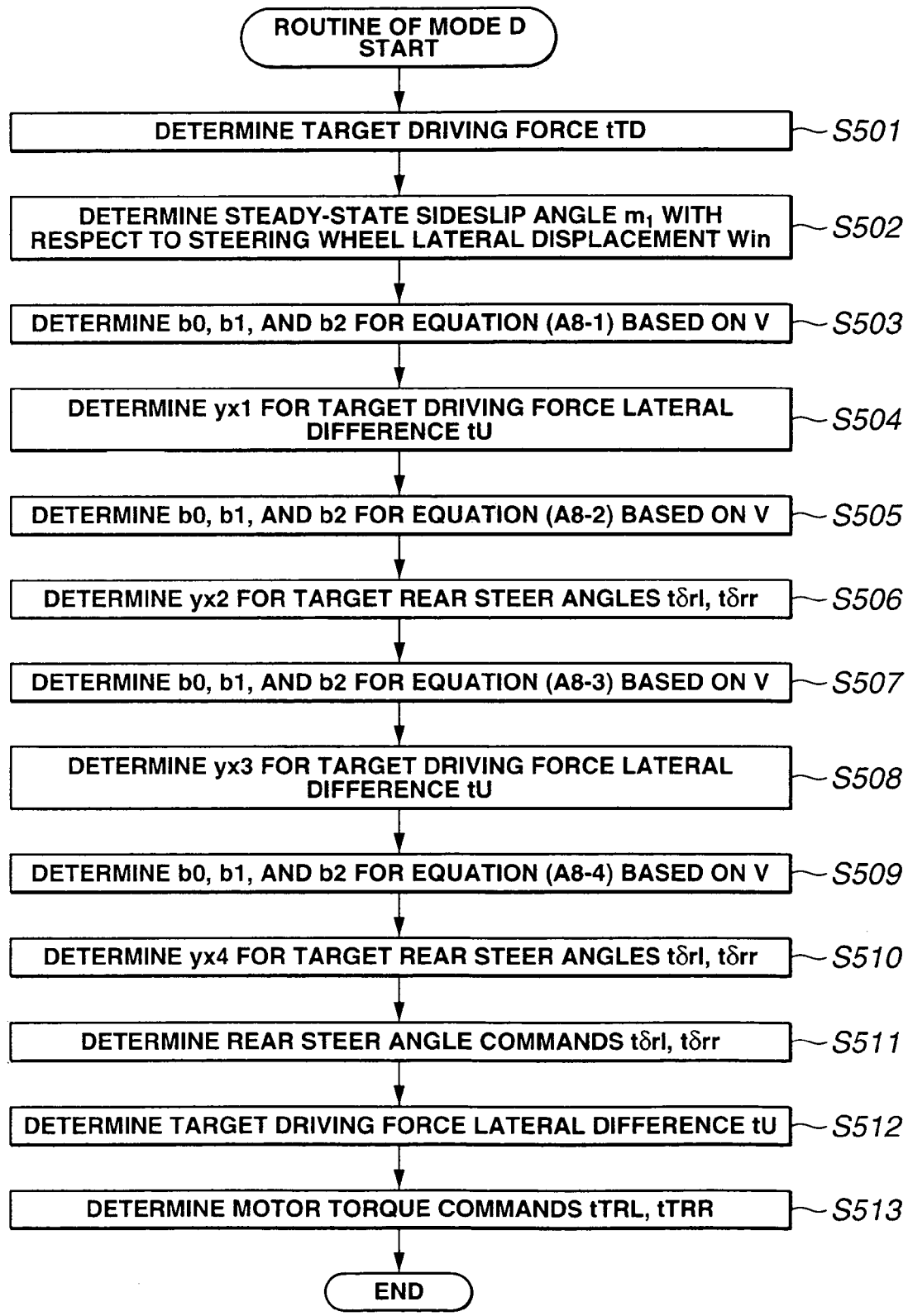
FIG. 5 is a flow chart depicting a routine of D mode to be executed by the control unit of the electric vehicle of FIG. 1.
Figure 6:
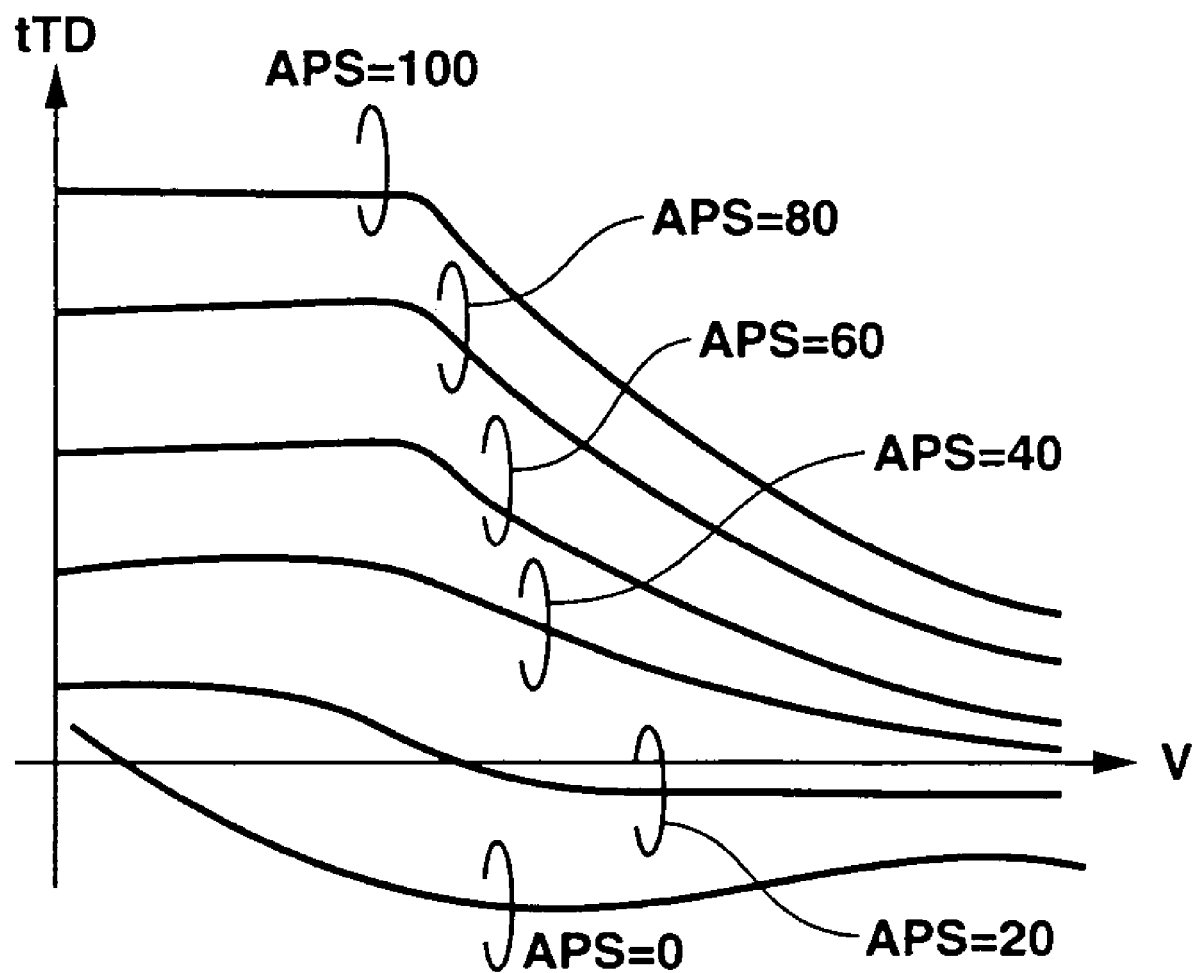
FIG. 6 is a characteristic map for determining a target driving force tTD, which is referred to by the routine of D mode.

The following describes the routine of D mode. FIG. 5 is a flow chart depicting the routine of D mode to be executed by control unit 30, which is step S415 in FIG. 3. First, at step S501, control unit 30 determines or computes target driving force tTD. The computation is implemented by table-lookup of a map MAP_tTD(V, APS) prepared and stored in ROM. The map MAP_tTD(V, APS), which provides data concerning the characteristic of target driving force tTD with respect to vehicle speed V and accelerator opening APS, is set as shown in FIG. 6.

Subsequent to step S501, at step S502, control unit 30 determines or computes $m_1$ in accordance with steering wheel lateral displacement Win. $m_1$ indicates a steady-state value of sideslip angle β in accordance with steering wheel lateral displacement Win. In this embodiment, $m_1$ is set to $w_n^2$ ($w_n$=4π). Alternatively, $m_1$ may be set to the product of steering wheel lateral displacement Win and a value which is determined by table lookup of a map MAP_m1(V, δ) stored in ROM so that $m_1$ varies in accordance with vehicle speed V and steering wheel angle δ.

Subsequent to step S502, at steps S503 through S512, control unit 30 determines or computes target driving force lateral difference tU, left rear steer angle command tδrl, and right rear steer angle command tδrr. This computation is performed so that the transfer functions from steering wheel angle δ to yaw rate γ and to sideslip angle β, and the transfer functions from steering wheel lateral displacement Win to yaw rate γ and to sideslip angle β provide desired responses. In this embodiment, the transfer functions are described in form of the equations (A5).

Subsequent to step S502, at step S503, control unit 30 determines or computes b0, b1, and b2 for the controller P1(s) (the equation (A8-1)) expressed in the form of the equation (A9), in accordance with vehicle speed V determined at step S420, using the following equations (B1).

$$b2=0$$

$$b1=(m_2 I_r)/(2L_t)$$

$$b0=(Vm_2 mL_r)/(2L_t) \quad (B1)$$

where $m_2$ is set so that the steady-state value of yaw rate γ with respect to steering wheel angle δ is δ/4, as follows.

$$m_2=W_n^2/4$$

m, Ir, Lr, and Lt in the equations (B1) are set to the design values of the electric vehicle.

Subsequent to step S503, at step S504, control unit 30 updates X2, and X1 by performing the integration operations ($s^{-1}$) in FIG. 4B by Euler integration, using the values of X2, and X1 determined in the immediately preceding execution of step S504. At this step S504, the input ux in FIG. 4B is set to steering wheel angle δ. The output yx is stored in a variable yx1. At step S504, the computed values of X2 and X1 in FIG. 4B are stored in variables X2a and X1a for the next execution. The output yx is computed in accordance with the block diagram of FIG. 4B, using the values of b0, b1, and b2 determined at step S503, and the updated values of X2 and X1, and is stored in variable yx1.

Subsequent to step S504, at step S505, control unit 30 determines or computes b0, b1, and b2 for the controller P2($s$) (the equation (A8-2)) expressed in the form of the equation (A9), in accordance with vehicle speed V determined at step S420, using the following equations (B2). In order to avoid zero division in this computation, vehicle speed V is constrained within a lower limit Vmin such as a speed of 1 [m/s].

$$b2=0$$
$$b1=m_2(mV^2-2L_rK_r)\tau/(2VK_r)$$
$$b0=m_2(mV^2-2L_rK_r)/(2VK_r) \quad (B2)$$

m, Lr, and Kr in the equations (B2) are set to the design values of the electric vehicle. Time constant τ is set to about 0.1 [s] in accordance with the delay of the rear steering servo, in this embodiment.

Subsequent to step S505, at step S506, control unit 30 updates X2, and X1 by performing the integration operations ($s^{-1}$) in FIG. 4B by Euler integration, using the values of X2, and X1 determined in the immediately preceding execution of step S506. At this step S506, the input ux in FIG. 4B is set to steering wheel angle δ. The output yx is stored in a variable yx2. At step S506, the computed values of X2 and X1 in FIG. 4B are stored in variables X2b and X1b for the next execution. The output yx is computed in accordance with the block diagram of FIG. 4B, using the values of b0, b1, and b2 determined at step S505, and the updated values of X2 and X1, and is stored in variable yx2.

Subsequent to step S506, at step S507, control unit 30 determines or computes b0, b1, and b2 for the controller P3($s$) (the equation (A8-3)) expressed in the form of the equation (A9), in accordance with vehicle speed V determined at step S420, using the following equations (B1').

$$b2=0$$
$$b1=m_1mVL_r/(2L_t)$$
$$b0=0 \quad (B1')$$

m, Lr, and Lt in the equations (B1') are set to the design values of the electric vehicle.

Subsequent to step S507, at step S508, control unit 30 updates X2, and X1 by performing the integration operations ($s^{-1}$) in FIG. 4B by Euler integration, using the values of X2, and X1 determined in the immediately preceding execution of step S508. At this step S508, the input ux in FIG. 4B is set to steering wheel lateral displacement Win. The output yx is stored in a variable yx3. At step S508, the computed values of X2 and X1 in FIG. 4B are stored in variables X2c and X1c for the next execution. The output yx is computed in accordance with the block diagram of FIG. 4B, using the values of b0, b1, and b2 determined at step S507, and the updated values of X2 and X1, and is stored in variable yx3. With b0=0 in the equations (B1'), the driving force lateral difference is not constantly generated in accordance with steering wheel lateral displacement Win. In other words, the steady-state gain of P3($s$) is zero.

Subsequent to step S508, at step S509, control unit 30 determines or computes b0, b1, and b2 for the controller P4($s$) (the equation (A8-4)) expressed in the form of the equation (A9), in accordance with vehicle speed V determined at step S420, using the following equations (B2').

$$b2=Vm_1m\tau/(2K_r)$$
$$b1=(m_1mV+2m_1\tau K_r)/2$$
$$b0=m_1 \quad (B2')$$

m, and Kr in the equations (B2') are set to the design values of the electric vehicle. Time constant τ is set to about 0.1 [s] as at step S505.

Subsequent to step S509, at step S510, control unit 30 updates X2, and X1 by performing the integration operations ($s^{-1}$) in FIG. 4B by Euler integration, using the values of X2, and X1 determined in the immediately preceding execution of step S510. At this step S510, the input ux in FIG. 4B is set to steering wheel lateral displacement Win. The output yx is stored in a variable yx4. At step S510, the computed values of X2 and X1 in FIG. 4B are stored in variables X2d and X1d for the next execution. The output yx is computed in accordance with the block diagram of FIG. 4B, using the values of b0, b1, and b2 determined at step S509, and the updated values of X2 and X1, and is stored in variable yx4.

Subsequent to step S510, at step S511, control unit 30 determines or computes left rear steer angle command tδrl and right rear steer angle command tδrr by summing the value of yx2 determined at step S506 and the value of yx4 determined at step S510, as follows.

$$t\delta_{rl}=t\delta_{rr}=yx2+yx4$$

Subsequent to step S511, at step S512, control unit 30 determines or computes target driving force lateral difference tU by summing the value of yx1 determined at step S504 and the value of yx3 determined at step S508, as follows.

$$tU=yx1+yx3$$

Subsequent to step S512, at step S513, control unit 30 determines or computes left rear motor torque command tTRL and right rear motor torque command tTRR in accordance with target driving force tTD and target driving force lateral difference tU, using the following equations (B3).

$$tTRL=tTD\cdot Rr/GG/2-tU\cdot Rr/GG$$
$$tTRL=tTD\cdot Rr/GG/2+tU\cdot Rr/GG \quad (B3).$$

Subsequent to step S513, the routine returns.

Figure 7A:
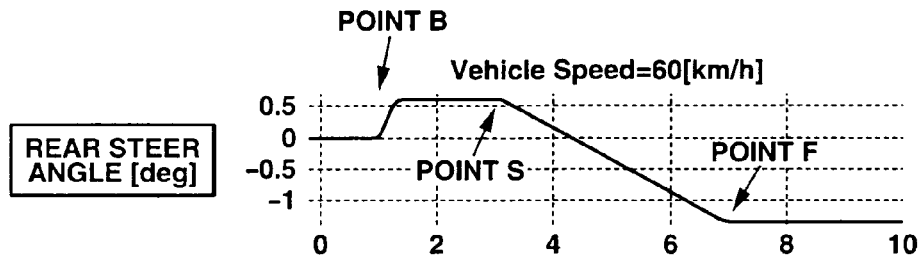
FIGS. 7A through 7E illustrate a sample simulation of cornering behavior of the electric vehicle of FIG. 1 in D mode.
Figure 7B:
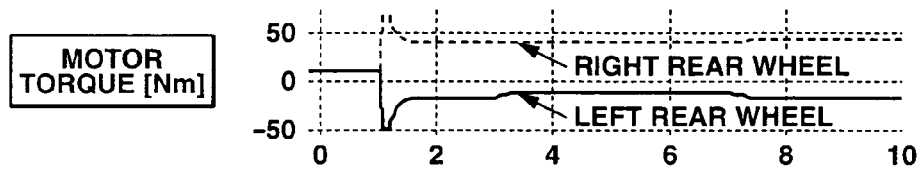
Figure 7C:
Figure 7D:
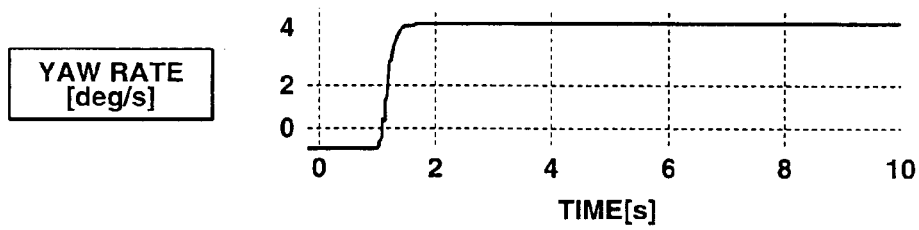
Figure 7E:
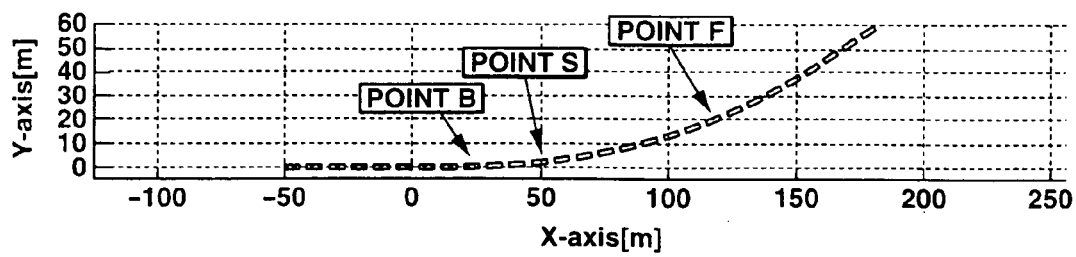

FIGS. 7A through 7E illustrate a sample simulation of cornering behavior of the electric vehicle of FIG. 1 in D mode. FIGS. 7A through 7D show changes in the state of the electric vehicle with respect to time. FIG. 7E shows a time-discrete trajectory of the electric vehicle at intervals of 0.5 [s] in the top view. In this simulation, the electric vehicle is initially traveling straight at a speed of 60 [m/h]. At time t=1 [s] (point B), steering wheel 11 is turned as a step function. Then, steering wheel 11 is displaced rightward gradually from 0° to −2° over a period from time t=3 [s] (point S) to time t=7 [s] (point F), and held at −2° after point F. After steering wheel 11 is turned at point B, yaw rate γ is generated to turn the electric vehicle. Before point S, sideslip angle β is held at zero without influence of steering wheel angle δ. During steering wheel 11 being traveling from point S to point F, sideslip angle β varies. On the other hand, yaw rate γ is held constant from point S to point F. As designed, yaw rate γ varies in accordance with steering wheel angle δ, without influence of steering wheel lateral displacement Win. As designed, sideslip angle β varies in accordance with steering wheel lateral displacement Win, without influence of steering wheel angle δ.

Figure 8A:
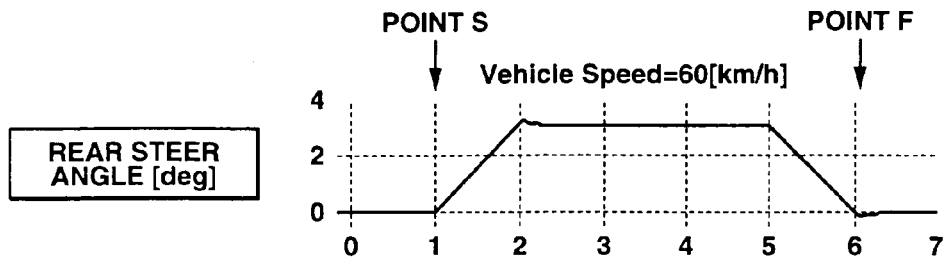
FIGS. 8A through 8F illustrate another sample simulation of cornering behavior of the electric vehicle of FIG. 1 in D mode.
Figure 8B:
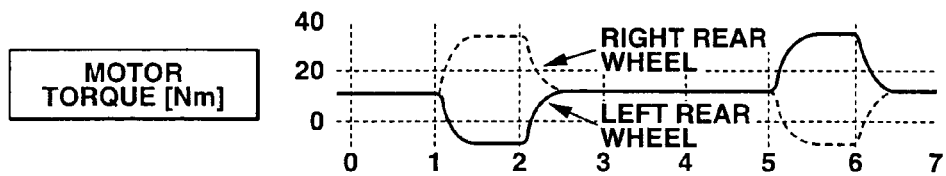
Figure 8C:
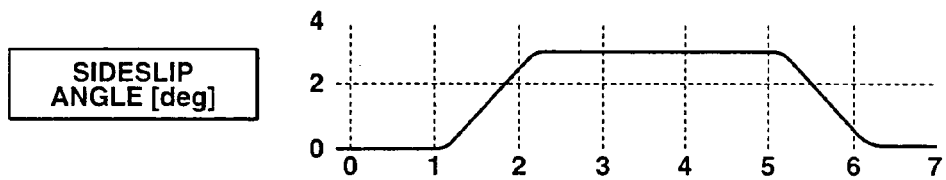
Figure 8D:
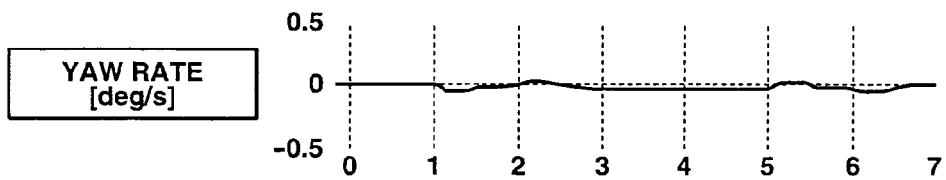
Figure 8E:
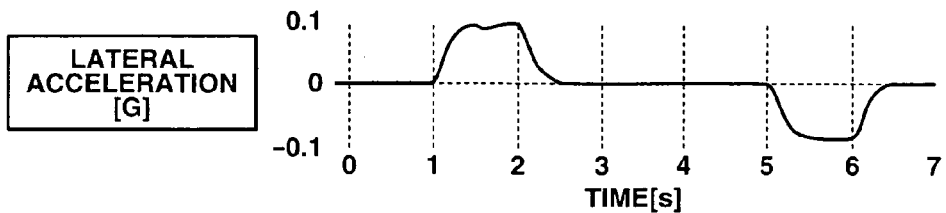
Figure 8F:
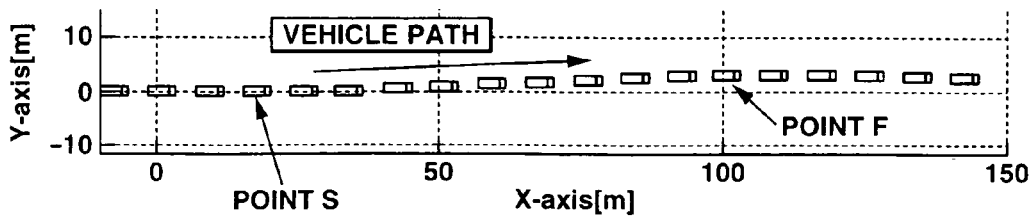

FIGS. 8A through 8F illustrate a sample simulation of cornering behavior of the electric vehicle in D mode. FIGS. 8A through 8E show changes in the state of the electric vehicle with respect to time. FIG. 8F shows a time-discrete trajectory of the electric vehicle at intervals of 0.5 [s] in the top view. In this simulation, the electric vehicle is initially traveling straight at a speed of 60 [km/h]. Steering wheel 11 is held in the neutral position, over the target duration of the simulation. At time t=1 [s] (point S), steering wheel 11 is manipulated to start to travel leftward. At time t=2 [s], steering wheel lateral displacement Win reaches 3°. Steering wheel lateral displacement Win is held constant, i.e. 3° over a period from time t=2 [s] to time t=5 [s]. Steering wheel lateral displacement Win is reduced from 3° to 0° over a period from time t=5 [s] to time t=6 [s]. As shown in FIG. 8F, the above-mentioned operation allows the electric vehicle to laterally travel without the vehicle heading held in the x-axis. The driving force lateral difference is transiently generated at a start point and end point of the lateral travel of the electric vehicle. The driving force lateral difference is not generated during the transient duration of the lateral travel (substantially from time t=2.5 [s] to time t=5 [s]). During steering wheel lateral displacement Win increasing (substantially from time t=1 [s] to time t=2 [s]), the rear steer angles are controlled to increase leftward, and the driving force lateral difference is controlled to cancel the yaw moment caused by the controlled steer angles and thereby to hold yaw rate γ constant. During steering wheel lateral displacement Win decreasing (substantially from time t=5 [s] to time t=6 [s]), the rear steer angles are controlled to change rightward to the neutral position, and the driving force lateral difference is controlled to cancel the yaw moment caused by the controlled steer angles and thereby to hold yaw rate γ constant.

Figure 9:
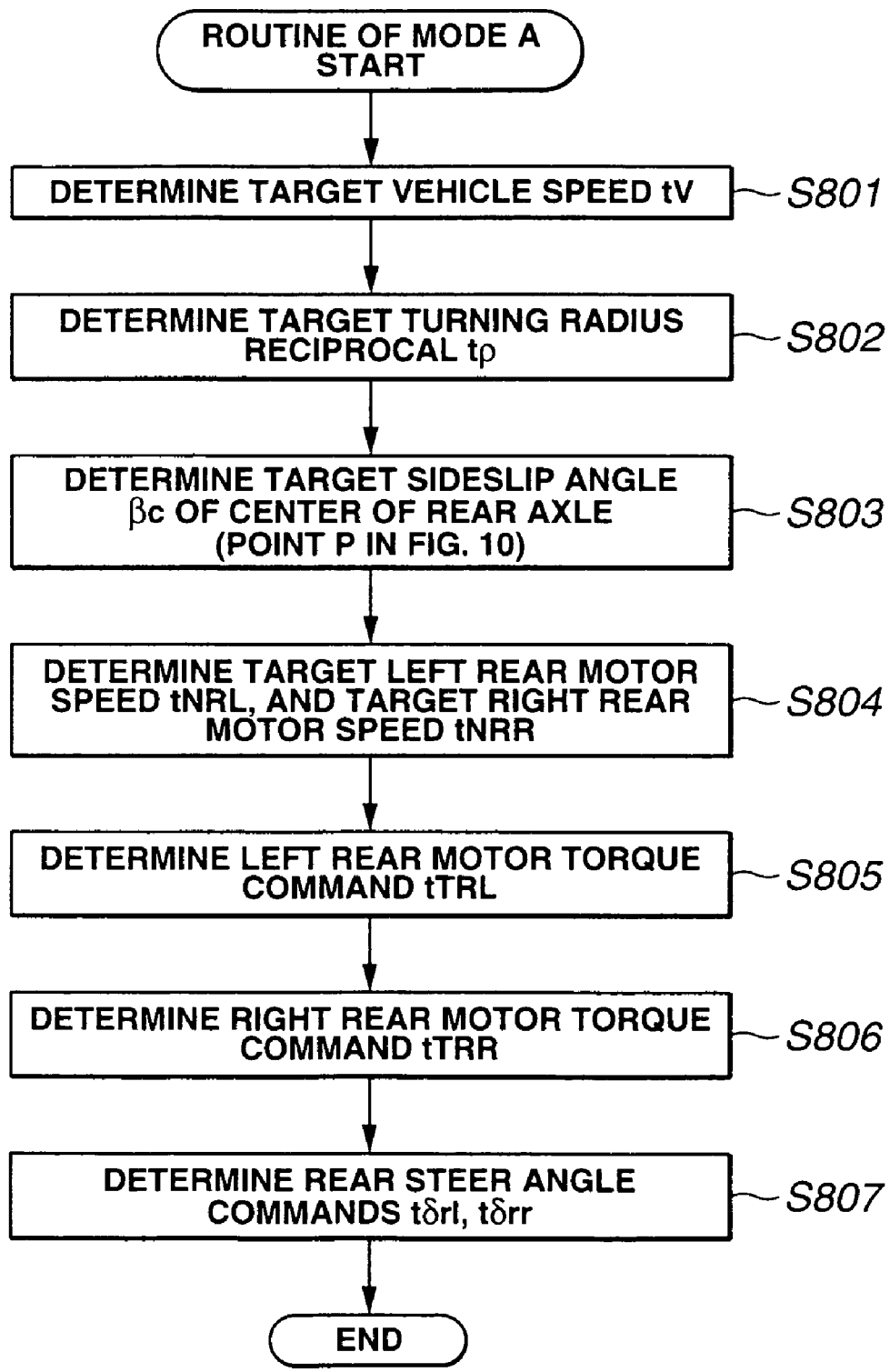
FIG. 9 is a flow chart depicting a routine of A mode to be executed by the control unit of the electric vehicle of FIG. 1.

The following describes the routine of A mode. FIG. 9 is a flow chart depicting the routine of A mode to be executed by control unit 30, which is step S414 in FIG. 3. First, at step S801, control unit 30 determines a target speed tV of the center of the rear axle. Target speed tV is set to be zero with the accelerator opening APS=0, to be a speed of 3 [m/s] with APS=100%, and to linearly increase with an increase in APS from 0 to 100%, in this embodiment.

Figure 10:
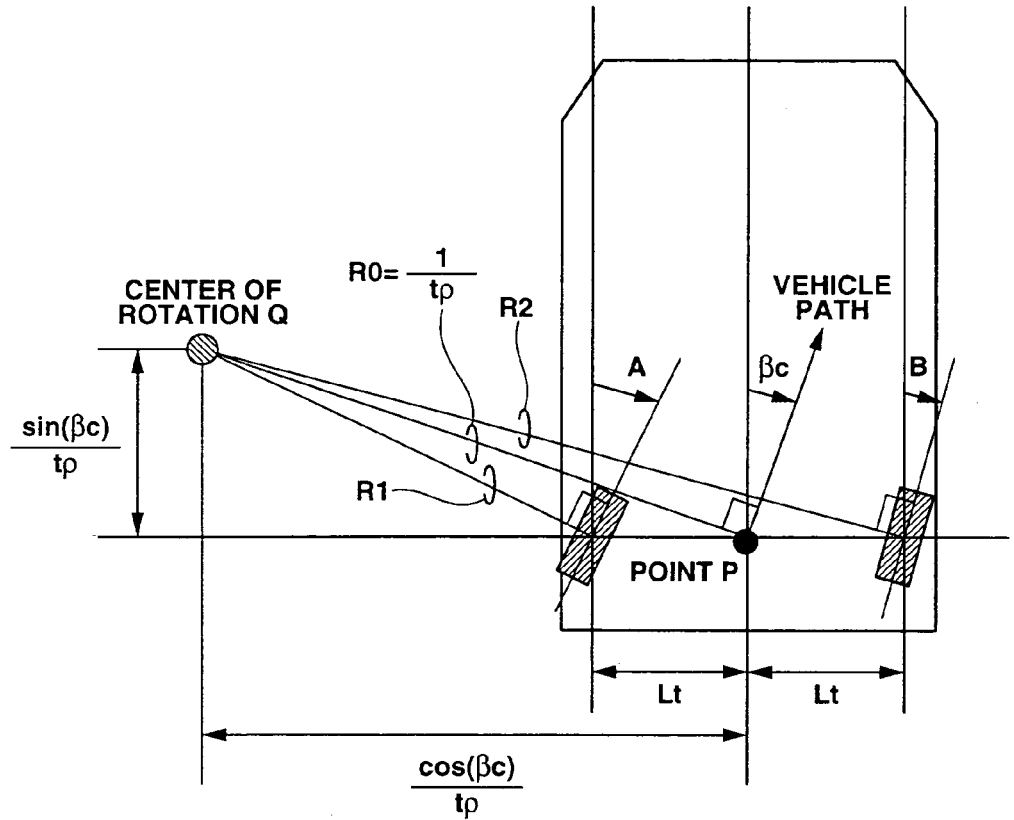
FIG. 10 illustrates how to control the electric vehicle of FIG. 1 in A mode.
Figure 11:
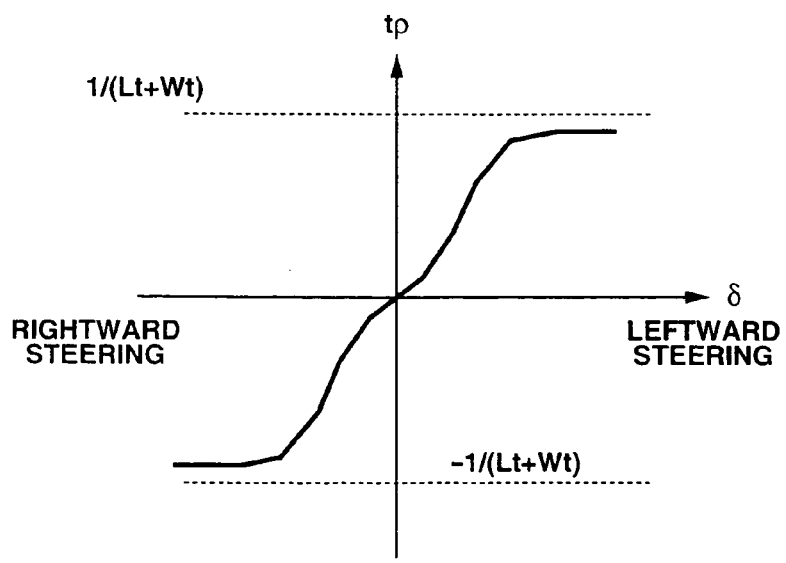
FIG. 11 is a characteristic map for determining a turning radius reciprocal tρ, which is referred to by the routines of A mode and AR mode.

Subsequent to step S801, at step S802, control unit 30 determines a target of the reciprocal of the turning radius of the center of the rear axle tρ. The center of the rear axle is indicated by point P in FIG. 10. Target turning radius reciprocal tρ is defined to be positive during left turn, that is, during the center of rotation Q being on the left side of the electric vehicle. Conversely, target turning radius reciprocal tρ is defined to be negative during right turn, that is, during the center of rotation Q being on the right side of the electric vehicle. Target turning radius reciprocal tρ is set to vary in accordance with steering wheel angle δ, as shown in FIG. 11. Specifically, target turning radius reciprocal tρ varies linearly with a change in steering wheel angle δ. However, target turning radius reciprocal tρ is constrained within bounds of −1/(Lt+Wt) and 1/(Lt+Wt), where Wt is half of the width of the tire. Lt is half of the tread of the electric vehicle.

Figure 12:
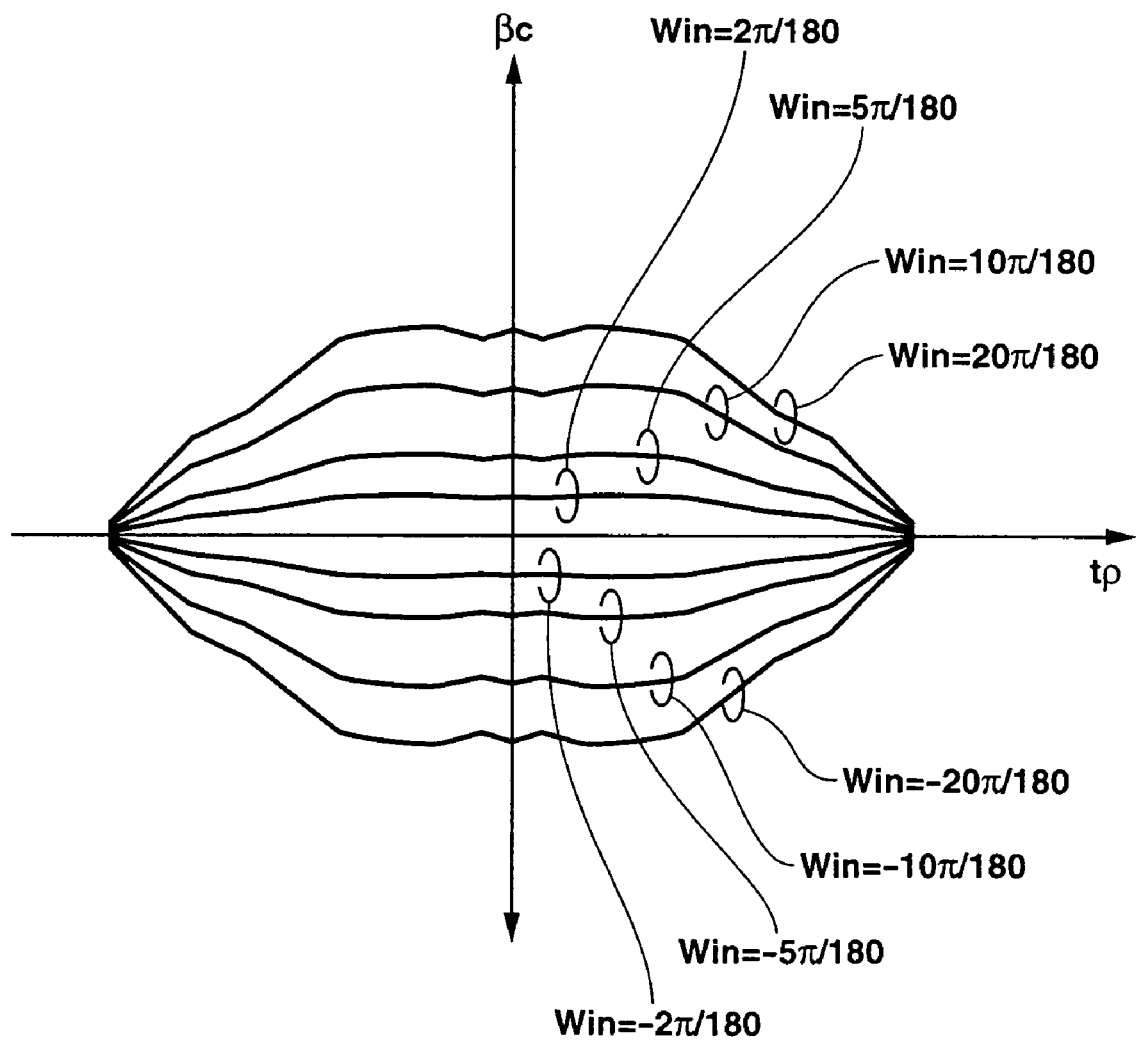
FIG. 12 is a characteristic map for determining a target sideslip angle βc, which is referred to by the routine of A mode.

Subsequent to step S802, at step S803, control unit 30 determines a target sideslip angle βc [rad] of the center of the rear axle. Target sideslip angle βc is an angle of the path of point P with respect to the vehicle heading, defined to be positive counterclockwise. Target sideslip angle βc is determined in accordance with target turning radius reciprocal tρ and steering wheel lateral displacement Win by table lookup of a characteristic table stored in ROM, as shown in FIG. 12. Target sideslip angle βc is set to increase with an increase in steering wheel lateral displacement Win and to decrease with an increase in target turning radius reciprocal tρ.

Subsequent to step S803, at step S804, control unit 30 determines a target left rear motor speed tNRL and a target right rear motor speed tNRR in accordance with target vehicle speed tV, target turning radius reciprocal tρ, and target sideslip angle βc. In order to achieve target turning radius reciprocal tρ, and target sideslip angle βc, the center of rotation Q is determined, as shown in FIG. 10. When the speed of point P is tV, the left wheel speed is tV*R1/R0 and the right wheel speed is tV*R2/R0, where R0 is a distance between point P and point Q, R1 is a distance between the left wheel and point Q, and R2 is a distance between the right wheel and point Q, as shown in FIG. 10. R1/R0 and R2/R0 are geometrically determined as shown in FIG. 10, as follows.

$$R1/R0 = sqrt(1 - 2t\rho L_t \cos(\beta_c) + t\rho^2 L_t^2)$$

$$R2/R0 = sqrt(1 + 2t\rho L_t \cos(\beta_c) + t\rho^2 L_t^2)$$

where sqrt is a square root of a parenthesized argument. Therefore, target left rear motor speed tNRL and target right rear motor speed tNRR are calculated using the following equations (C1).

$$tNRL = tV/Rr \cdot GG \cdot sqrt(1 - 2t\rho L_t \cos(\beta_c) + t\rho^2 L_t^2)$$

$$tNRR = tV/Rr \cdot GG \cdot sqrt(1 + 2t\rho L_t \cos(\beta_c) + t\rho^2 L_t^2) \quad (C1)$$

Subsequent to step S804, at step S805, control unit 30 regulates left rear motor speed NRL in accordance with target left rear motor speed tNRL by feedback control. Specifically, control unit 30 determines left rear motor torque command tTRL using the following equation, to control left rear motor speed NRL by proportional control.

$$tTRL = Kp1 \cdot (tNRL - NRL)$$

where Kp1 is a constant as a proportional gain.

Subsequent to step S805, at step S806, control unit 30 regulates right rear motor speed NRR in accordance with target right rear motor speed tNRR by feedback control. Specifically, control unit 30 determines right rear motor torque command tTRR using the following equation, to control right rear motor speed NRR by proportional control.

$$tTRR = Kp1 \cdot (tNRR - NRR)$$

where Kp1 is the same constant as at step S805.

Subsequent to step S806, at step S807, control unit 30 determines left rear steer angle command tδrl and right rear steer angle command tδrr. Rear steer angle commands tδrl, tδrr are determined based on the location of point Q in FIG. 10 which is determined in accordance with target turning radius reciprocal tρ determined at step S802, and target sideslip angle βc determined at step S803. Left rear steer angle command tδrl is determined to be angle A in FIG. 10 using the following equation so that the line connecting point Q and the center of the left rear wheel is normal to the wheel heading of the left rear wheel.

$$t\delta_{rl} = \tan^{-1}\{\sin(\beta_c)/(\cos(\beta_c) - t\rho L_t)\}$$

Right rear steer angle command tδrr is determined to be angle B in FIG. 10 using the following equation so that the line connecting point Q and the center of the right rear wheel is normal to the wheel heading of the right rear wheel.

$$t\delta_{rr} = \tan^{-1}\{\sin(\beta_c)/(\cos(\beta_c) + t\rho L_t)\}$$

Subsequent to step S807, the routine returns.

Figure 13A:
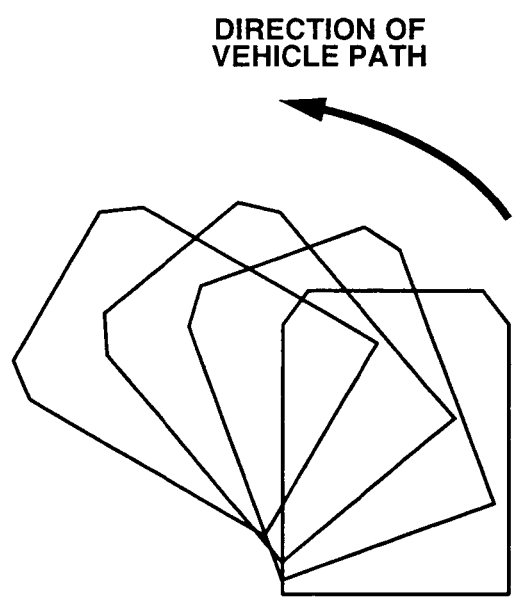
FIG. 13A illustrates how the electric vehicle of FIG. 1 behaves in A mode.

According to the above-mentioned routine of A mode, the electric vehicle is controlled to perform a small turn on a point near the inside rear wheel, as shown in FIG. 13A. The electric vehicle in which the control unit is configured to determine a turning center in accordance with the setpoint of the turning radius and the setpoint of the attitude, and to control the steer angles so that a heading of each of the rear wheels is substantially normal to a line connecting the turning center and the rear wheel, is effective for smooth rotation of the wheels under no influence of turning radius. This reduces road noise caused by tire strain and reduces tire wear during the electric vehicle traveling.

Figure 14A:
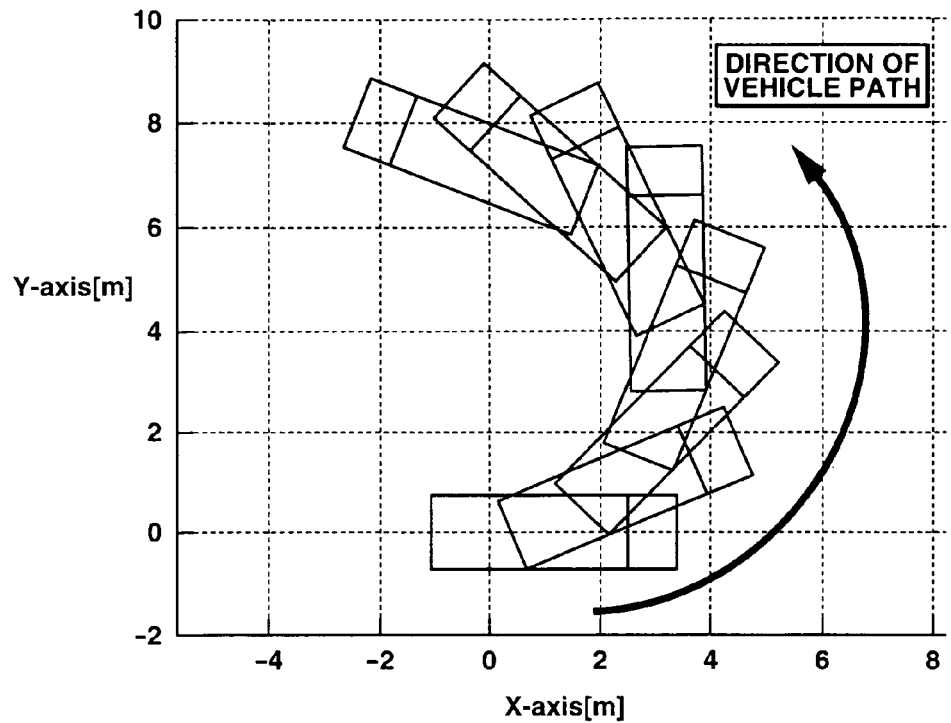
FIGS. 14A and 14B illustrate sample simulations of cornering behavior of the electric vehicle of FIG. 1 in A mode.
Figure 14B:
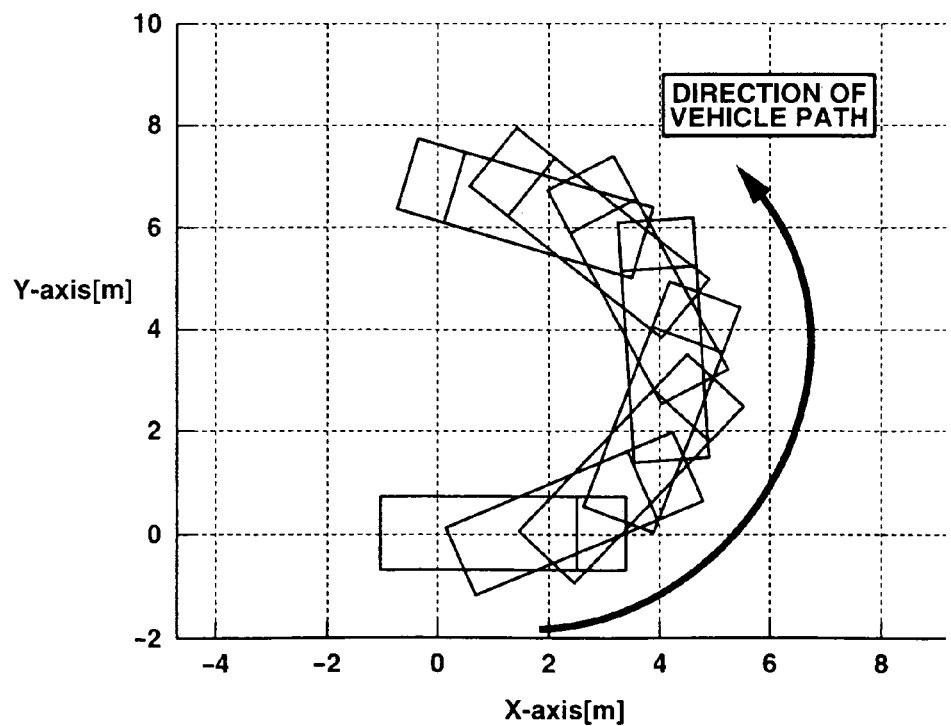

FIGS. 14A and 14B show sample simulations in which the electric vehicle performs a small turn at a speed of 1 [km/h] in A mode. FIG. 14A shows a simulation of steady-state turning in which steering wheel lateral displacement Win is zero and steering wheel angle δ is a counterclockwise position. FIG. 14B is a simulation of steady-state turning in which steering wheel lateral displacement Win is a rightward position and steering wheel angle δ is the same counterclockwise position as the simulation of FIG. 14A. In comparison to the simulation of FIG. 14A, the electric vehicle is turning with the rear end of the electric vehicle extending outward, in the simulation of FIG. 14B. Thus, the vehicle attitude is independently controlled by adjusting steering wheel lateral displacement Win.

Figure 15:
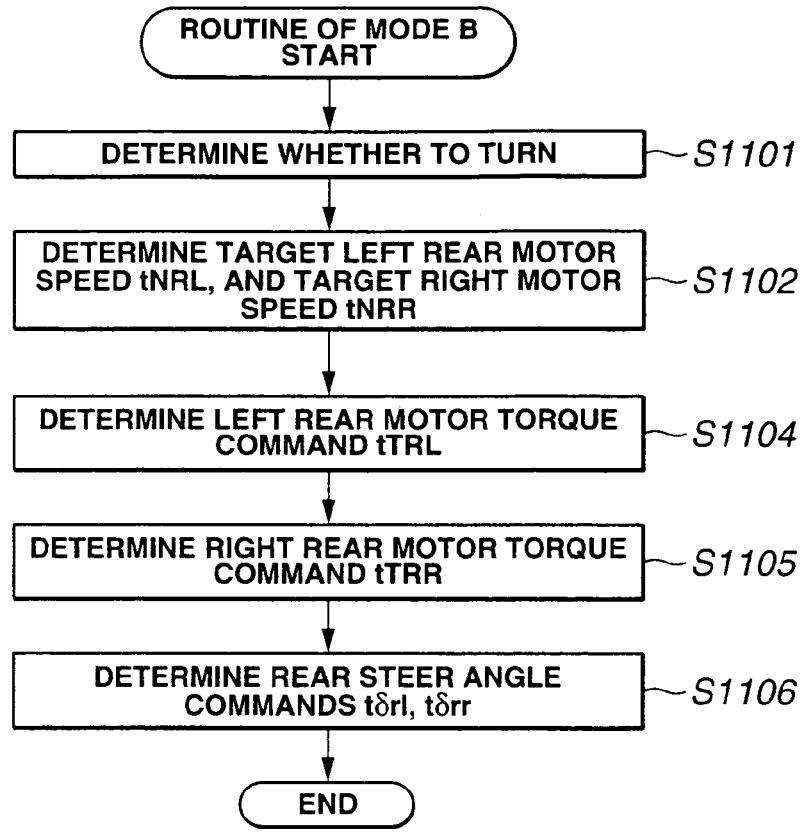
FIG. 15 is a flow chart depicting a routine of B mode to be executed by the control unit of the electric vehicle of FIG. 1.

The following describes the routine of B mode. FIG. 15 is a flow chart depicting the routine of B mode to be executed by control unit 30, which is step S412 in FIG. 3. First, at step S1101, control unit 30 determines whether or not to perform turning. When accelerator opening APS is zero, control unit 30 sets a flag f_MB to zero. On the other hand, when accelerator opening APS is not zero, flag f_MB is set to 1 to perform turning motion.

Figure 16:
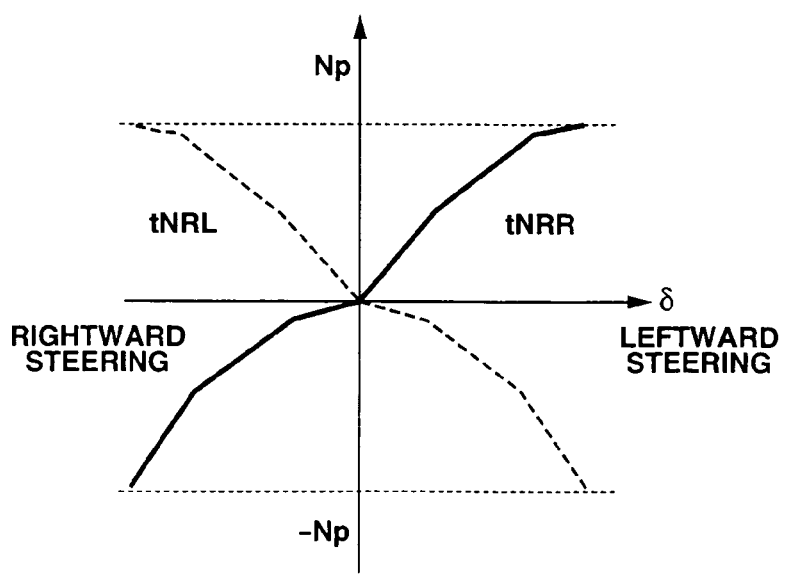
FIG. 16 is a characteristic map for determining target motor speeds tNRL, tNRR, which is referred to by the routine of B mode.
Figure 17:
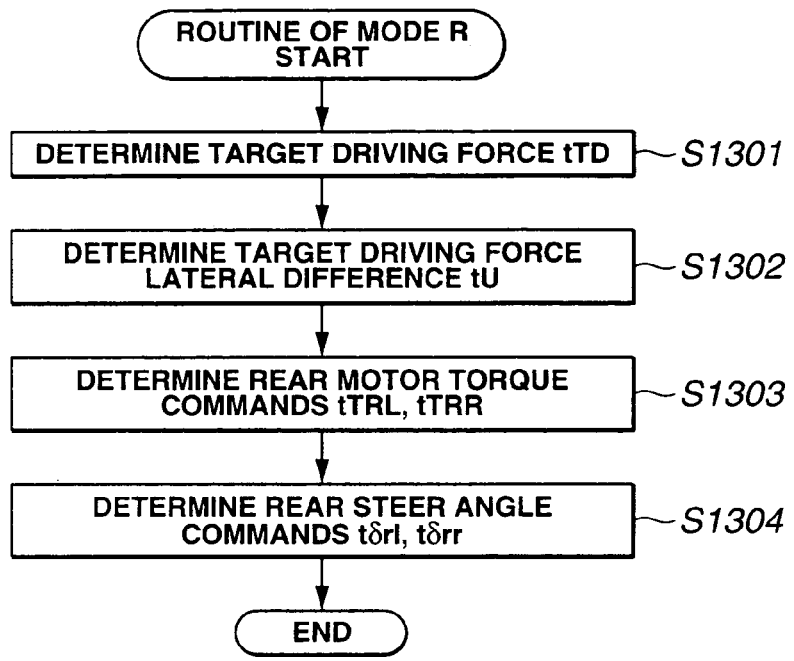
FIG. 17 is a flow chart depicting a routine of R mode to be executed by the control unit of the electric vehicle of FIG. 1.

Subsequent to step S1101, at step S1102, control unit 30 determines target left rear motor speed tNRL and target right rear motor speed tNRR in accordance with steering wheel angle δ. FIG. 16 is a characteristic map for determining target motor speeds tNRL, tNRR used in B mode. Target left rear motor speed tNRL and target right rear motor speed tNRR are set to be opposite in direction to each other. Preferably, when the absolute value of steering wheel angle δ is maximum, the absolute vale of target left rear motor speed tNRL may be set to be identical to the absolute value of target right rear motor speed tNRR. Accordingly, when the absolute value of steering wheel angle δ is maximum, the electric vehicle is controlled to turn on the center of the rear axle. Target left rear motor speed tNRL and target right rear motor speed tNRR vary monotonously over steering wheel angle δ between zero and the maximum. Accordingly, the center of rotation gradually varies toward the center of the rear axle with an increase in steering wheel angle δ.

Subsequent to step S1102, at step S1104, control unit 30 determines left rear motor torque command tTRL using the following equation.

$$tTRL = Kp2 \cdot (RAT \cdot tNRL - NRL)$$

where Kp2 is a constant as a proportional gain, and RAT is a parameter which is incremented from an initial value of 0 toward 1 during f_MB=1, by a predetermined increment such as 0.005 per 5 ms, and decremented toward 0 during f_MB=0, by a predetermined decrement such as 0.005 per 5 ms. Accordingly, when the state of f_MB is switched between f_MB=0 and f_MB=1, left rear motor torque command tTRL is gradually changed to smoothly change the vehicle behavior. Subsequent to step S1104, at step S1105, control unit 30 determines right rear motor torque command tTRR using the following equation.

$$tTRR = Kp2 \cdot (RAT \cdot tNRR - NRR)$$

where RAT is the same value as at step S1104.

Subsequent to step S1105, at step S1106, control unit 30 determines left rear steer angle command tδrl and right rear steer angle command tδrr. In this embodiment, left rear steer angle command tδrl and right rear steer angle command tδrr are both set to zero. Alternatively, left rear steer angle command tδrl and right rear steer angle command tδrr may be determined by table lookup of a table stored in ROM which provides a relationship between left and right rear steer angle commands tδrl, tδrr and steering wheel angle δ. Subsequent to step S1106, the routine returns.

Figure 13B:
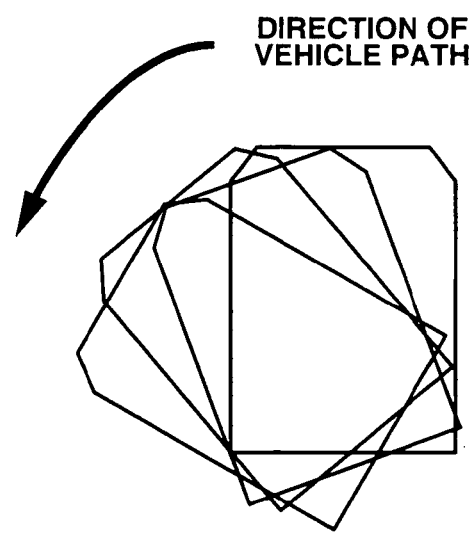
FIG. 13B illustrates how the electric vehicle of FIG. 1 behaves in B mode.

Thus, control unit 30 is configured to perform the following in an operating mode: determining a setpoint of a wheel speed of each of the rear wheels in accordance with the setpoint of the yaw rate; and controlling the wheel torques so that the wheel speeds vary in accordance with the associated setpoints, the setpoints of the wheel speeds being different in direction. According to the above-mentioned routine of B mode, the electric vehicle is controlled to perform a small turn on a point near the center of the rear axle, as shown in FIG. 13B. In B mode, the turning radius may be smaller than in A mode.

Figure 18:
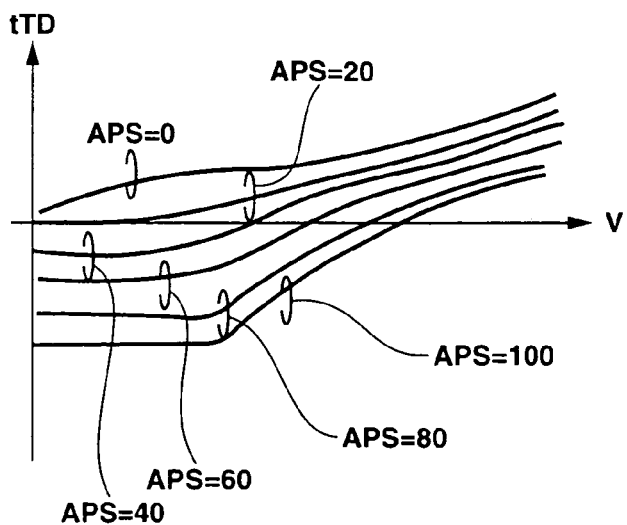
FIG. 18 is a characteristic map for determining a target driving force tTD, which is referred to by the routine of R mode.

The following describes the routine of R mode. FIG. 16 is a flow chart depicting the routine of R mode to be executed by control unit 30, which is step S422 in FIG. 3. First, at step S1301, control unit 30 determines or computes target driving force tTD. The computation is implemented by table-lookup of a map MAP_tTD(V, APS) prepared and stored in ROM. The map MAP_tTD(V, APS), which provides data concerning the characteristic of target driving force tTD with respect to vehicle speed V and accelerator opening APS, is set as shown in FIG. 18.

Subsequent to step S1301, at step S1302, control unit 30 determines target driving force lateral difference tU. Target driving force lateral difference tU is set to be proportional to steering wheel angle δ using the following equation.

$$tU = KK^* \delta$$

where KK is a negative constant value so that the electric vehicle turns left with steering wheel 11 turned left. Specifically, with steering wheel 11 turned left, the electric vehicle travels backward and counterclockwise along a circle in the top view.

Subsequent to step S1302, at step S1303, control unit 30 determines or calculates left rear motor torque command tTRL and right rear motor torque command tTRR in accordance with target driving force tTD and target driving force lateral difference tU, using the following equations (B3).

$$tTRL = tTD \cdot Rr/GG/2 - tU \cdot Rr/GG$$

$$tTRL = tTD \cdot Rr/GG/2 + tU \cdot Rr/GG \quad \text{(B3)}$$

Subsequent to step S1303, at step S1304, control unit 30 determines left rear steer angle command tδrl and right rear steer angle command tδrr. In this embodiment, left rear steer angle command tδrl and right rear steer angle command tδrr are both set to zero. Alternatively, left rear steer angle command tδrl and right rear steer angle command tδrr may be determined by table lookup of a table stored in ROM which provides a relationship between the commands and steering wheel angle δ. Subsequent to step S1304, the routine returns.

Figure 19:
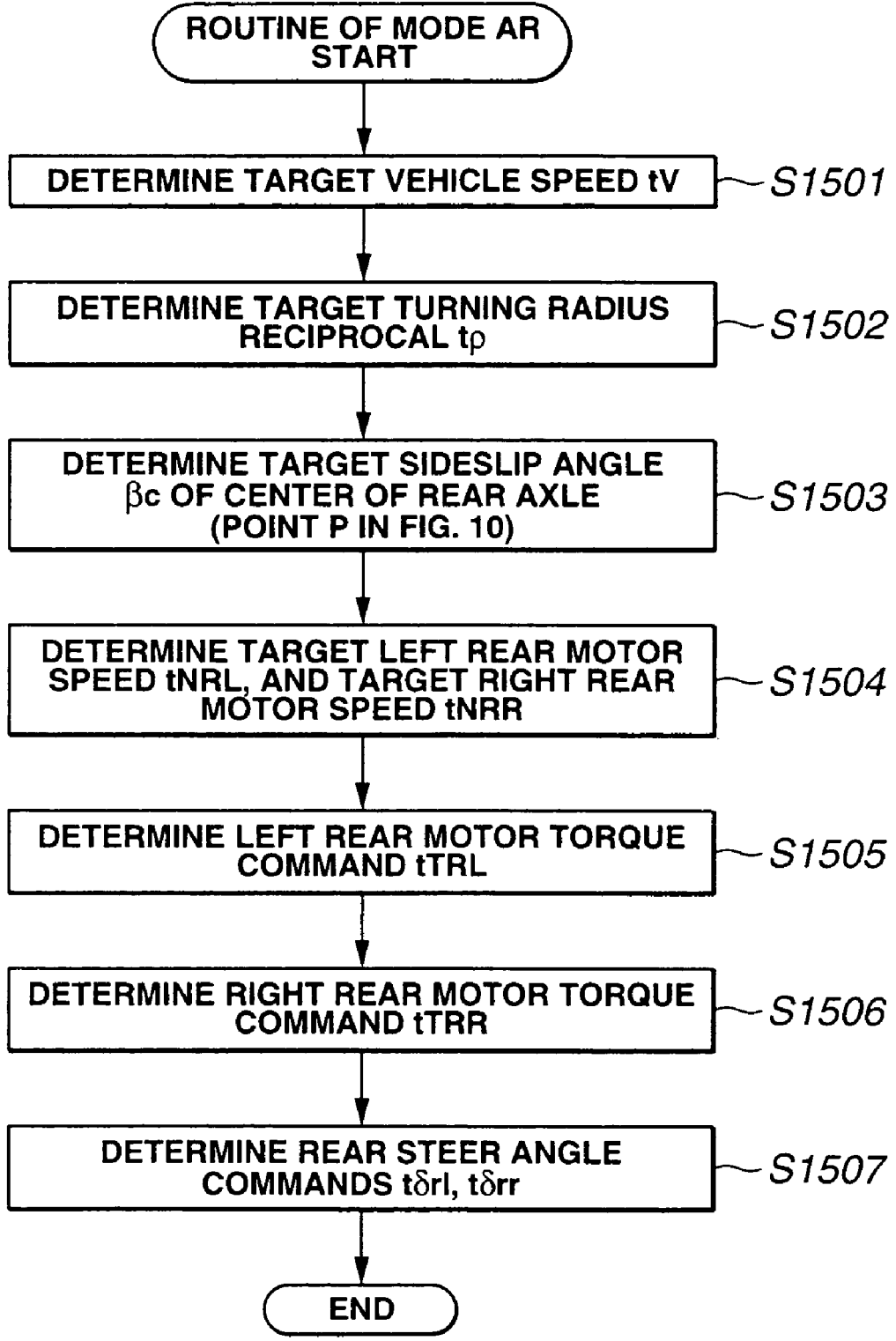
FIG. 19 is a flow chart depicting a routine of AR mode to be executed by the control unit of the electric vehicle of FIG. 1.

The following describes the routine of AR mode. FIG. 19 is a flow chart depicting the routine of AR mode to be executed by control unit 30, which is step S421 in FIG. 3. First, at step S1501, control unit 30 determines a target speed tV of the center of the rear axle. Target speed tV is set to be zero with the accelerator opening APS=0, to be a speed of −3 [m/s] with APS=100%, and to linearly increase with an increase in APS from 0 to 100%, in this embodiment.

Subsequent to step S1501, at step S1502, control unit 30 determines a target of the reciprocal of the turning radius of the center of the rear axle tρ. The specific calculation is same as at step S802.

Subsequent to step S1502, at step S1503, control unit 30 determines target sideslip angle βc [rad] of the center of the rear axle. Target sideslip angle βc is an angle of the path of point P with respect to the vehicle heading, defined to be positive counterclockwise. Target sideslip angle βc is determined as at step S803.

Subsequent to step S1503, at step S1504, control unit 30 determines target left rear motor speed tNRL and target right rear motor speed tNRR in accordance with target vehicle speed tV, target turning radius reciprocal tρ, and target sideslip angle βc, using the following equations (D1), as at step S804.

$$tNRL = tV/Rr \cdot GG \cdot sqrt(1 - 2t\rho L_t \cos(\beta_c) + t\rho^2 L_t^2)$$

$$tNRR = tV/Rr \cdot GG \cdot sqrt(1 + 2t\rho L_t \cos(\beta_c) + t\rho^2 L_t^2) \qquad (D1)$$

Subsequent to step S1504, at step S1505, control unit 30 regulates left rear motor speed NRL in accordance with target left rear motor speed tNRL by feedback control. Specifically, control unit 30 determines left rear motor torque command tTRL using the following equation, to control left rear motor speed NRL by proportional control.

$$tTRL = Kp3 \cdot (tNRL - NRL)$$

where Kp3 is a constant as a proportional gain. Subsequent to step S1505, at step S1506, control unit 30 regulates right rear motor speed NRR in accordance with target right rear motor speed tNRR by feedback control. Specifically, control unit 30 determines right rear motor torque command tTRR using the following equation, to control right rear motor speed NRR by proportional control.

$$tTRR = Kp3 \cdot (tNRR - NRR)$$

where Kp3 is the same constant as at step S1505.

Subsequent to step S1506, at step S1507, control unit 30 determines left rear steer angle command tδrl and right rear steer angle command tδrr. The specific calculation is same as at step S807. Subsequent to step S1507, the routine returns.

The following describes effects produced by the electric vehicle in accordance with the embodiment of the present invention. (1) An electric vehicle including: a vehicle body 1; a front wheel (42FL; 42FR) supported on the vehicle body 1 for steering motion in accordance with motion of the vehicle body 1; a pair of rear wheels 2RL, 2RR supported on the vehicle body 1 for steering motion; a steering unit (51, 52, 53) configured to regulate a steer angle δr of each of the rear wheels 2RL, 2RR; a motor unit (3RL, 3RR) configured to independently apply a wheel torque TRL, TRR to each of the rear wheels 2RL, 2RR; a first setpoint determination section 23 configured to determine a setpoint of a total tTD of the wheel torques TRL, TRR; a second setpoint determination section 26 configured to determine a setpoint of an attitude β of the vehicle body 1; a third setpoint determination section 21 configured to determine a setpoint of a yaw rate γ of the vehicle body 1; and a control unit 30 connected for signal communication to the steering unit (51, 52, 53), the motor unit (3RL, 3RR), the first setpoint determination section 23, the second setpoint determination section 26, and the third setpoint determination section 21, the control unit 30 being configured to perform the following: controlling the total of the wheel torques TRL, TRR in accordance with the associated setpoint; and controlling the steer angles δr and the difference between the wheel torques TRL, TRR so that the attitude β and the yaw rate γ vary in accordance with the associated setpoints, is effective for allowing a driver to independently control the vehicle yaw rate and the vehicle attitude in modes of D, A, and AR. Therefore, the vehicle attitude is controlled in accordance with the shapes of roads or driver's intention, independently of the vehicle yaw rate. (2) The electric vehicle wherein the control unit 30 is configured to transiently generate the difference between the wheel torques TRL, TRR with a change in the setpoint of the attitude β, is effective for enhancing the responsiveness of steering, for example, when steering wheel 11 is operated like a step function during the vehicle traveling at a high speed, and thereby effective for reducing the delay of the vehicle dynamic behavior with respect to the steering input and controlling the vehicle attitude as desired. In addition, under steady-state conditions, the driving force lateral difference is set to zero independently of the target vehicle attitude, preventing that the steering response becomes quick to adversely affect the stability of the vehicle behavior. (3) The electric vehicle wherein the control unit 30 is configured to perform the following during the setpoint of the yaw rate γ being at or near zero: controlling the steer angles δr in accordance with the setpoint of the attitude β; and controlling the difference between the wheel torques TRL, TRR to cancel a yaw moment caused by the controlled steer angles, is effective for that the vehicle performs lane-change with holding the vehicle heading as shown in FIG. 8F. (4) The electric vehicle further including a steering wheel 11 supported on the vehicle body 1 for rotation and another movement, wherein the second setpoint determination section 26 is configured to measure an angular position of the steering wheel 11 to determine the setpoint of the attitude β, and wherein the third setpoint determination section 21 is configured to measure another position of the steering wheel 11 to determine the setpoint of the yaw rate, is effective for allowing a driver to rotate steering wheel 11 to adjust the vehicle yaw rate and to move laterally steering wheel 11 to adjust the vehicle cornering attitude, and thereby effective for reducing the driver steering load. (5) The electric vehicle wherein the control unit 30 is configured to perform the following in an operating mode A: setting a setpoint of a turning radius to be small; determining a turning center Q in accordance with the setpoint of the turning radius and the setpoint of the attitude β; and controlling the steer angles so that a heading of each of the rear wheels 2RL, 2RR is substantially normal to a line (R1; R2) connecting the turning center Q and the rear wheel (2RL; 2RR), is effective for regulating the wheel headings of the rear wheels in accordance with the paths of the rear wheels, to reduce running resistance, and to reduce tire strain. This results in an efficient turn of the vehicle, and in reduction of road noise and tire wear.

In the shown embodiment, the target vehicle attitude is determined by the steering wheel lateral displacement. However, the electric vehicle may include a two-degree-of-freedom input unit, the second setpoint determination section may be configured to measure a first parameter of the input unit to determine the setpoint of the attitude, and the third setpoint determination section may be configured to measure a second parameter of the input unit to determine the setpoint of the yaw rate. Specifically, the target vehicle attitude may be determined by up-and-down movement of a steering wheel, telescoping movement of a steering wheel, or the state of a switch attached to a steering wheel. It is desirable that the target vehicle attitude may be determined by motion of a steering wheel, because the motion for determining the vehicle attitude and the steering motion can be operated in parallel. However, a switch may be provided near shift lever 25 and operated to adjust the vehicle attitude.

Figure 20:
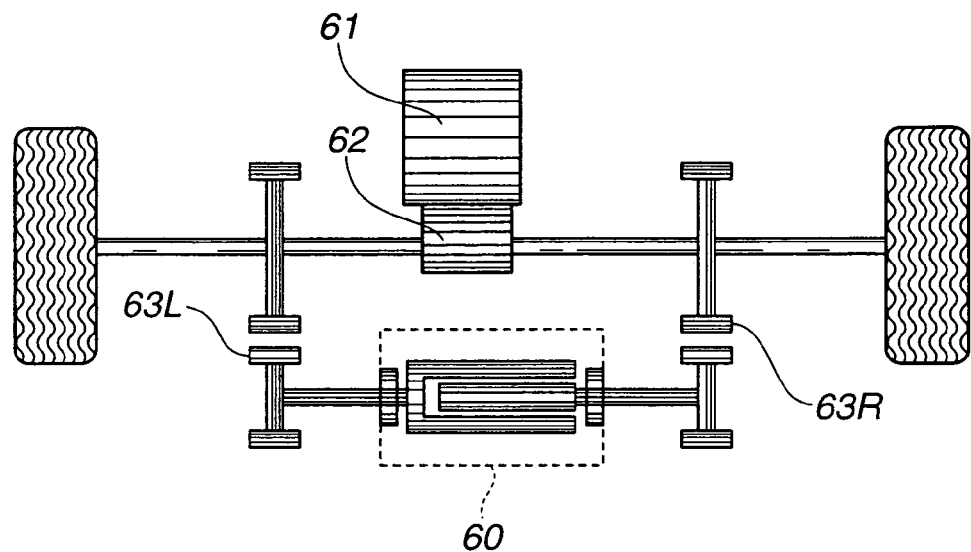
FIG. 20 is a schematic diagram depicting a driving system of an electric vehicle in accordance with a modification to the embodiment.

The driving unit is not limited to the embodiment of FIG. 1. Alternatively, the driving unit may be configured as shown in FIG. 20. In this alternative embodiment, the driving unit includes a clutch motor 60, a drive motor 61, a differential gear 62, and left and right speed reducers 63L, 63R. Clutch motor 60 includes an inner member rotatably mounted and connected to speed reducer 63R, and an outer member rotatably mounted and connected to speed reducer 63L. When clutch motor 60 generates a torque, the torque generates a driving force lateral difference. The driving unit may be of any form that controls the left and right rear wheel torques independently.

Figure 21:
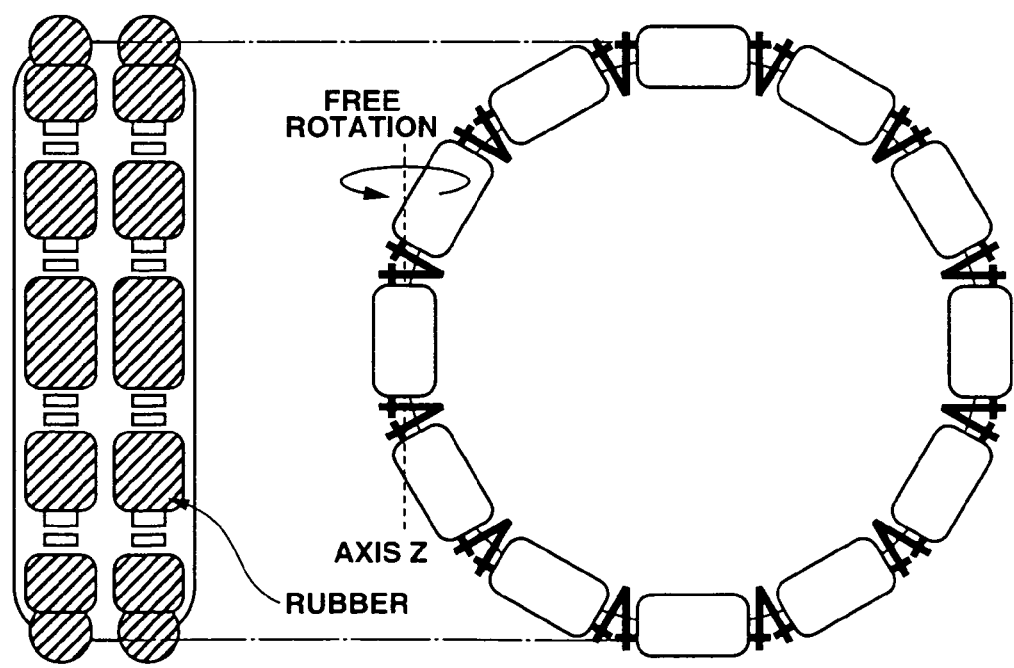
FIG. 21 is a schematic diagram depicting a front wheel of an electric vehicle in accordance with another modification to the embodiment.

In the shown embodiment, the front wheel is a caster wheel so that the front wheel is free from a force substantially along the lateral direction of the vehicle body. However, the front wheel may be other types of wheels that are adapted to be free from a force substantially along the lateral direction of the vehicle body. For example, the front wheel may be held against steering motion and configured to include a plurality of cylindrical rubber rotor supported on its outer face for rotation on its circumferential axis (axis Z), as shown in FIG. 21.

The front wheel may be actively steered by an electric motor, that is, by a steer-by-wire system, so that the steer angle of the front wheel follows motion of the vehicle body.

As mentioned above, the electric vehicle in accordance with the embodiment of the present invention is configured so that the cornering behavior and the vehicle attitude is each independently controlled by the driving force lateral difference and the steering of the rear wheels. Therefore, the electric vehicle is configured to perform intended operations such as small turn, diagonal movement, and turn-in-place movement, and constructed providing wide space utility with a small cost.

This application is based on a prior Japanese Patent Application No. 2004-258788 filed on Sep. 6, 2004. The entire contents of this Japanese Patent Application No. 2004-258788 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electric vehicle comprising:
   a vehicle body;
   a front wheel supported on the vehicle body for steering motion in accordance with motion of the vehicle body;
   a pair of rear wheels supported on the vehicle body for steering motion;
   a steering unit configured to regulate a steer angle of each of the rear wheels;
   a motor unit configured to independently apply a wheel torque to each of the rear wheels;
   a first setpoint determination section configured to determine a setpoint of a total of the wheel torques;
   a second setpoint determination section configured to determine a setpoint of an attitude of the vehicle body;
   a third setpoint determination section configured to determine a setpoint of a yaw rate of the vehicle body; and
   a control unit connected for signal communication to the steering unit, the motor unit, the first setpoint determination section, the second setpoint determination section, and the third setpoint determination section, the control unit being configured to perform the following:
      controlling the total of the wheel torques in accordance with an associated setpoint; and
      controlling the steer angles and a difference between the wheel torques so that the attitude and the yaw rate vary in accordance with associated setpoints.

2. The electric vehicle as claimed in claim 1, wherein the control unit is configured to transiently generate the difference between the wheel torques with a change in the setpoint of the attitude.

3. The electric vehicle as claimed in claim 1, wherein the control unit is configured to perform the following during the setpoint of the yaw rate being at or near zero:
   controlling the steer angles in accordance with the setpoint of the attitude; and
   controlling the difference between the wheel torques to cancel a yaw moment caused by the controlled steer angles.

4. The electric vehicle as claimed in claim 1, wherein the control unit is configured to control the steer angles and the difference between the wheel torques so that the attitude and the yaw rate each vary as a second-order response to the associated setpoint.

5. The electric vehicle as claimed in claim 1, further comprising a two-degree-of-freedom input unit, wherein the second setpoint determination section is configured to measure a first parameter of the input unit to determine the setpoint of the attitude, and wherein the third setpoint determination section is configured to measure a second parameter of the input unit to determine the setpoint of the yaw rate.

6. The electric vehicle as claimed in claim 1, further comprising a steering wheel supported on the vehicle body for rotation and another movement, wherein the second setpoint determination section is configured to measure an angular position of the steering wheel to determine the setpoint of the attitude, and wherein the third setpoint determination section is configured to measure another position of the steering wheel to determine the setpoint of the yaw rate.

7. The electric vehicle as claimed in claim 6, wherein the third setpoint determination section is configured to measure a lateral displacement of the steering wheel to determine the setpoint of the yaw rate.

8. The electric vehicle as claimed in claim 1, wherein the control unit is configured to perform the following in an operating mode:
   setting a setpoint of a turning radius to be small;
   determining a turning center in accordance with the setpoint of the turning radius and the setpoint of the attitude; and
   controlling the steer angles so that a heading of each of the rear wheels is substantially normal to a line connecting the turning center and the rear wheel.

9. The electric vehicle as claimed in claim 8, wherein the control unit is configured to inhibit the operating mode during a vehicle speed of the electric vehicle being large.

10. The electric vehicle as claimed in claim 1, wherein the control unit is configured to perform the following in an operating mode:
- determining a setpoint of a wheel speed of each of the rear wheels in accordance with the setpoint of the yaw rate; and
- controlling the wheel torques so that the wheel speeds vary in accordance with the associated setpoints,
- wherein the setpoints of the wheel speeds are different in direction.

11. The electric vehicle as claimed in claim 10, wherein the setpoints of the wheel speeds are same in magnitude during a magnitude of the setpoint of the yaw rate being a maximum value.

12. The electric vehicle as claimed in claim 10, wherein the control unit is configured to inhibit the operating mode during a vehicle speed of the electric vehicle being large.

13. The electric vehicle as claimed in claim 1, wherein the motor unit comprises a pair of motors each configured to apply the wheel torque to an associated one of the rear wheels.

14. The electric vehicle as claimed in claim 1, wherein the front wheel is a caster wheel.

15. The electric vehicle as claimed in claim 1, wherein the control unit is configured to actively steer the front wheel in accordance with motion of the vehicle body.

16. The electric vehicle as claimed in claim 1, wherein a center of mass of the electric vehicle is located nearer to the rear wheels than to the front wheel.

17. The vehicle as claimed in claim 1, wherein the motor unit comprises a pair of reversible motors each configured to apply the wheel torque.

18. An electric vehicle comprising:
- a vehicle body;
- a front wheel supported on the vehicle body, and adapted to be free from a force along a lateral direction of the vehicle body;
- a pair of rear wheels supported on the vehicle body for steering motion;
- first setpoint determination means for determining a setpoint of a total of a wheel torque applied to each of the rear wheels;
- second setpoint determination means for determining a setpoint of an attitude of the vehicle body;
- third setpoint determination means for determining a setpoint of a yaw rate of the vehicle body;
- steering control means for controlling a steer angle of each of the rear wheels so that the attitude and the yaw rate vary in accordance with associated setpoints; and
- motor control means for controlling the total of the wheel torques in accordance with an associated setpoint, and for controlling a difference between the wheel torques at least in accordance with the setpoint of the yaw rate.

19. The vehicle as claimed in claim 18, wherein the front wheel comprises a plurality of cylindrical rotors each supported on its outer face for rotation on its circumferential axis.

* * * * *